US012576702B1

(12) United States Patent
 Wang

(10) Patent No.: US 12,576,702 B1
(45) Date of Patent: Mar. 17, 2026

(54) PICKUP TRUCK TONNEAU COVER

(71) Applicant: Kunshan Qunguang Automotive Technology Co., Ltd., Suzhou (CN)

(72) Inventor: Shuaiping Wang, Suzhou (CN)

(73) Assignee: Kunshan Qunguang Automotive Technology Co., Ltd., Suzhou (CN)

( * ) Notice: Subject to any disclaimer, the term of this patent is extended or adjusted under 35 U.S.C. 154(b) by 0 days.

(21) Appl. No.: 19/340,949

(22) Filed: Sep. 26, 2025

(30) Foreign Application Priority Data

Mar. 31, 2025 (CN) .......................... 202510389599.0

(51) Int. Cl.
 *B60J 7/14* (2006.01)
(52) U.S. Cl.
 CPC ..................................... *B60J 7/141* (2013.01)
(58) Field of Classification Search
 CPC . B60J 7/141; B60J 7/1621; B60J 7/041; B60J 7/1614; B60J 7/198; B60J 7/1607; B60J 7/042; B60J 7/106; B60J 7/062; B60J 7/065; B60J 7/0573; B60J 10/90; B60J 5/0498
 USPC .............. 296/100.08, 100.09, 100.03, 100.1, 296/100.02, 100.05
 See application file for complete search history.

(56) References Cited

U.S. PATENT DOCUMENTS

| | | | | | |
|---|---|---|---|---|---|
| 3,544,156 | A | * | 12/1970 | Rusten ..................... | B60J 7/141 |
| | | | | | 296/100.1 |
| 3,874,721 | A | * | 4/1975 | Tuggle .................... | B60J 7/062 |
| | | | | | 296/105 |
| 5,005,896 | A | * | 4/1991 | Li ........................... | B60J 7/062 |
| | | | | | 296/105 |
| 6,257,260 | B1 | * | 7/2001 | Phillips .................. | B62D 25/06 |
| | | | | | 296/105 |
| 7,097,228 | B1 | * | 8/2006 | Norgard .................. | B60J 7/022 |
| | | | | | 296/100.03 |
| 7,261,362 | B1 | * | 8/2007 | Mendez .................. | B60J 7/064 |
| | | | | | 296/100.09 |
| 7,374,225 | B2 | * | 5/2008 | Petelka ................... | B60J 7/065 |
| | | | | | 296/105 |

(Continued)

FOREIGN PATENT DOCUMENTS

| | | | | | |
|---|---|---|---|---|---|
| CN | 116494859 | A | * | 7/2023 | ............... B60P 7/04 |

*Primary Examiner* — Amy R Weisberg
*Assistant Examiner* — Veronica M Condo
(74) *Attorney, Agent, or Firm* — Fideli Law PLLC; Qiang Li

(57) ABSTRACT

A pickup truck tonneau cover includes one or a plurality of cover plates and a pair of folding apparatuses respectively mounted at two side walls of a pickup truck bed. Each folding apparatus includes a mounting frame and a folding mechanism; the mounting frame is mounted at an inner side of a truck bed; the folding mechanism is provided within the mounting frame; a plurality of mounting arms are provided at the folding mechanism; one end of the cover plate is mounted at a corresponding mounting arm of one folding mechanism, and another end of the same cover plate is mounted at a corresponding mounting arm of another folding mechanism; the folding mechanism is configured to telescopically move in a length direction of the truck bed, the mounting arms move along with the folding mechanism, such that the cover plate is switchable between a horizontal state and a non-horizontal state.

21 Claims, 14 Drawing Sheets

(56) References Cited

U.S. PATENT DOCUMENTS

| | | | | |
|---|---|---|---|---|
| 7,549,695 | B2 * | 6/2009 | Royer | B60J 7/062 |
| | | | | 296/105 |
| 8,783,755 | B2 * | 7/2014 | Sinkauz | B60J 7/026 |
| | | | | 296/100.09 |
| 10,029,546 | B2 * | 7/2018 | Acosta Loyola | B60P 7/04 |
| 12,403,752 | B2 * | 9/2025 | Hammoud | B60J 7/141 |
| 2025/0187411 | A1 * | 6/2025 | Lee | B60J 7/0573 |

* cited by examiner

PICKUP TRUCK TONNEAU COVER

CROSS-REFERENCE TO RELATED APPLICATIONS

This application claims priority to Chinese Patent Application No. 202510389599.0, filed on Mar. 31, 2025, the entire contents of which are incorporated herein by reference.

TECHNICAL FIELD

The present application relates to the technical field of automobile parts, and in particular to a pickup truck tonneau cover.

BACKGROUND

Pickup trucks are an important part of the automobile market, typically including a passenger cab and an open cargo bed. In order to protect cargo from adverse weather, enhance privacy and security, and improve the overall appearance of the vehicle, the cargo bed is usually covered with a tonneau cover. The primary functions of the tonneau cover include providing water resistance and theft prevention. Common types of tonneau covers include flip-fold type, retractable type, soft roll-up type, and frame type.

Existing flip-fold tonneau covers are typically made of multiple panels connected by hinges. During use, the panels are flipped sequentially to be folded or unfolded, thereby opening or closing the cover. However, such covers suffer from poor operational convenience and require considerable effort and time to operate. In addition, the installed covers often lack sufficient stability, posing a risk of detachment when the pickup truck is driven at high speeds. Their waterproof performance is also inadequate, making them prone to leakage. Moreover, such covers cannot achieve electrification and intelligence, whereas electrification and intelligence are considered future trends in the tonneau cover industry.

SUMMARY

The main objective of the present application is to provide a pickup truck tonneau cover, which can at least partially solve or alleviate the defects in the related art.

According to an aspect of the present application, a pickup truck tonneau cover is disclosed. The pickup truck tonneau cover of the present application includes: one or a plurality of cover plates and a pair of folding apparatuses respectively mounted at two side walls of a pickup truck bed.

Each folding apparatus includes a mounting frame and a folding mechanism; the mounting frame is mounted at an inner side of a truck bed; the folding mechanism is provided within the mounting frame; a plurality of mounting arms are provided at the folding mechanism. One end of the cover plate is mounted at a corresponding mounting arm of one folding mechanism, and another end of the same cover plate is mounted at a corresponding mounting arm of another folding mechanism.

The folding mechanism is configured to telescopically move in a length direction of the truck bed, such that the folding mechanism is switchable between an unfolded state and a folded state, and the mounting arms move along with the folding mechanism, such that the cover plate is switchable between a horizontal state and a non-horizontal state.

When the folding mechanism is in the unfolded state, the plurality of cover plates are all in the horizontal state and overlapped in sequence; a top surface of a side wall of the truck bed abuts against bottom surfaces of the plurality of cover plates, placing the truck bed in an enclosed state. When the folding mechanism is in the folded state, the plurality of cover plates are all in the non-horizontal state and retracted to a front of the truck bed adjacent to a cab so that the truck bed is in an open state.

According to an embodiment, the folding mechanism includes a scissor mechanism; the scissor mechanism includes a plurality of intersecting rod assemblies sequentially connected along the length direction of the truck bed; and each of the intersecting rod assemblies includes one or more pairs of support rods that are hinged to each other. Adjacent intersecting rod assemblies are connected with each other via an upper hinge shaft and a lower hinge shaft; the mounting frame is provided with a slideway arranged along the length direction of the truck bed; and the upper hinge shaft is configured to move along the slideway.

According to an embodiment, ends of adjacent intersecting rod assemblies are meshed with each other via a gear; rotating shafts of a pair of meshing gears are connected with each other via a connecting member; the mounting frame is provided with a slideway arranged along the length direction of the truck bed; and the rotating shafts or the connecting member of the pair of gears at the upper end are configured to move along the slideway.

According to an embodiment, a first intersecting rod assembly among the plurality of intersecting rod assemblies is located at a front end of the scissor mechanism adjacent to the cab; and the first intersecting rod assembly is hinged to the mounting frame.

According to an embodiment, the first intersecting rod assembly is connected to a corresponding first mounting arm among the plurality of mounting arms via a lifting and rotating bracket; and the lifting and rotating bracket is configured to drive the first mounting arm to rotate and lift or lower the first mounting arm, while a pair of support rods of the first intersecting rod assembly pivot relative to each other.

According to an embodiment, other mounting arms except the first mounting arm are respectively connected to one of a pair of support rods of a corresponding intersecting rod assembly.

According to an embodiment, the lifting and rotating bracket includes a first connecting rod, a second connecting rod and a drive connecting rod; the first connecting rod and the second connecting rod are hinged via a first pivot; the first pivot is offset from a center point of the first connecting rod and adjacent to a first end of the first connecting rod; the first pivot is offset from a center point of the second connecting rod and adjacent to a first end of the second connecting rod; the first end of the second connecting rod is hinged to the first mounting arm; a first end of the drive connecting rod is hinged to a second end of the first connecting rod via a second pivot; the second pivot is configured to be slidable relative to the first mounting arm; a second end of the drive connecting rod is slidably connected to the slideway via a hinged third pivot, and the scissor mechanism in motion is capable of driving the second end of the drive connecting rod to move along the slideway; a first end of the first connecting rod is hinged to the mounting frame; a second end of the second connecting rod is slidably connected to the mounting frame via a hinged fourth pivot; and a connection position of the first connecting rod and the second connecting rod on the mounting frame is located above the slideway.

According to an embodiment, the lifting and rotating bracket includes a first connecting rod and a second connecting rod; the first connecting rod and the second connecting rod are hinged via a first pivot; the first pivot is offset from a center point of the first connecting rod and adjacent to a first end of the first connecting rod; the first pivot is offset from a center point of the second connecting rod and adjacent to a first end of the second connecting rod; a second end of the first connecting rod is slidably connected to the first mounting arm via a hinged second pivot; a first end of the second connecting rod is hinged to the first mounting arm; a first end of the first connecting rod is hinged to the mounting frame; a second end of the second connecting rod is slidably connected to the slideway via a hinged fourth pivot; and one of a pair of support rods of the first intersecting rod assembly is meshed with the first end of the first connecting rod via a gear.

According to an embodiment, a second intersecting rod assembly among the plurality of intersecting rod assemblies is located at a rear end of the scissor mechanism adjacent to a tailgate; the second intersecting rod assembly is slidably connected to the slideway; the second intersecting rod assembly is connected to a corresponding second mounting arm among the plurality of mounting arms via a lifting and rotating bracket; the lifting and rotating bracket is configured to drive the second mounting arm to rotate and lift or lower the second mounting arm, while the pair of support rods of the second intersecting rod assembly pivot relative to each other.

According to an embodiment, the lifting and rotating bracket includes a first connecting rod, a second connecting rod and a drive connecting rod; the first connecting rod and the second connecting rod are hinged via a first pivot; the first pivot is offset from a center point of the first connecting rod and adjacent to a first end of the first connecting rod; the first pivot is offset from a center point of the second connecting rod and adjacent to a first end of the second connecting rod; the first end of the second connecting rod is hinged to the second mounting arm; a first end of the drive connecting rod is hinged to a second end of the first connecting rod via a second pivot; the second pivot is configured to be slidable relative to the second mounting arm; a second end of the drive connecting rod is slidably connected to the slideway via a hinged third pivot, and the scissor mechanism in motion is capable of driving the second end of the drive connecting rod to move along the slideway; a sliding slot is provided at the mounting frame; the sliding slot is parallel to the slideway and located above the slideway; a second end of the second connecting rod is slidably connected to the sliding slot via a hinged fourth pivot; a first end of the first connecting rod is slidably connected to the sliding slot via a hinged fifth pivot; and the scissor mechanism in motion is capable of driving the first end of the first connecting rod to move synchronously along the sliding slot.

According to an embodiment, the lifting and rotating bracket includes a first connecting rod and a second connecting rod; the first connecting rod and the second connecting rod are hinged via a first pivot; the first pivot is offset from a center point of the first connecting rod and adjacent to a first end of the first connecting rod; the first pivot is offset from a center point of the second connecting rod and adjacent to a first end of the second connecting rod; a second end of the first connecting rod is slidably connected to the second mounting arm via a hinged second pivot; a first end of the second connecting rod is hinged to the second mounting arm; a second end of the second connecting rod is slidably connected to the slideway via a hinged fourth pivot; a first end of the first connecting rod is slidably connected to the slideway via a hinged fifth pivot; one of a pair of support rods of the second intersecting rod assembly is meshed with the first end of the first connecting rod via a gear; and rotating shafts of a pair of meshing gears are connected with each other via a connecting member.

According to an embodiment, two adjacent cover plates among the plurality of cover plates form a first lapping part that overlaps each other.

According to an embodiment, the two adjacent cover plates form mutually matching inclined surfaces, stepped surfaces or curved surfaces at an end of the first lapping part.

According to an embodiment, the first lapping part is provided with a seal for sealing a gap between adjacent cover plates.

According to an embodiment, a waterproof plate is provided at a top surface of a front wall of the truck bed; and the first intersecting rod assembly is connected to a corresponding first mounting arm among the plurality of mounting arms via a drive bracket.

According to an embodiment, the waterproof plate and a first cover plate connected to the first mounting arm form a second lapping part that overlaps each other; and mutually matching inclined surfaces, stepped surfaces or curved surfaces are formed at ends of the second lapping part.

According to an embodiment, the waterproof plate is provided with an avoidance groove; when the scissor mechanism is in the folded state, the first mounting arm is provided in the avoidance groove; a waterproof cover is hinged to the waterproof plate; when the scissor mechanism is in the unfolded state, the waterproof cover covers the avoidance groove.

According to an embodiment, the drive bracket includes a first driving rod and a second driving rod; the first driving rod and the second driving rod are hinged via a sixth pivot; the sixth pivot is slidably provided at the slideway; a second end of the first driving rod is hinged to the first mounting arm; and a second end of the second driving rod is hinged to one of a pair of support rods of the first intersecting rod assembly.

According to the pickup truck tonneau cover of one or more embodiments of the present application, one or more of the following technical effects can be achieved.

1. By placing the mounting frame on the inside of the truck bed and locating the scissor mechanism within the mounting frame, the folding mechanism's center of gravity is lowered, improving vehicle stability. The mounting frame also protects the scissor mechanism, preventing items from the truck bed from entering. The mounting frame can be a box-shaped structure, enclosing the scissor mechanism from multiple sides to provide dust and water protection, thereby enhancing its durability. During telescopic operation, the scissor mechanism remains within the mounting frame, preventing it from extending beyond the mounting frame and truck bed, reducing the risk of damage, which also improves the stability of the scissor mechanism's installation and prevents it from falling during high-speed driving.

2. When the scissor mechanism is in the expanded state, the mounting arm is parallel to the top surface of the truck bed, and multiple cover plates are overlapped in sequence to form a flat plate. The area of the flat plate is larger than the area of the opening on the top surface of the truck bed. The flat plate completely covers the opening on the top surface of the truck bed. The top surface of the truck bed abuts the bottom surface of the flat plate, and a seal is provided at the abutment point, placing the interior of the truck bed in an enclosed state, effectively improving the dust and water proof effect of the truck bed.

3. When the scissor mechanism is in the folded state, the mounting arm tilts and closes to one end of the truck bed as the scissor mechanism moves, causing multiple cover plates to also tilt and adjacent to one end of the truck bed, so that the truck bed is in an open state. Compared with the folding cover structure, the opening area of the truck bed can be increased, making it easier to take items.

4. During the folding process of the scissor mechanism, the cover plates are connected in an overlapping manner, which effectively avoids the problem of mutual interference between the cover plates when they start to rotate from a flat state.

5. The driving mechanism is connected to the scissor mechanism to drive the scissor mechanism to extend and retract in the length direction of the truck bed, thereby improving the degree of automation of the device movement.

DETAILED DESCRIPTION OF THE EMBODIMENTS

Figure 1:
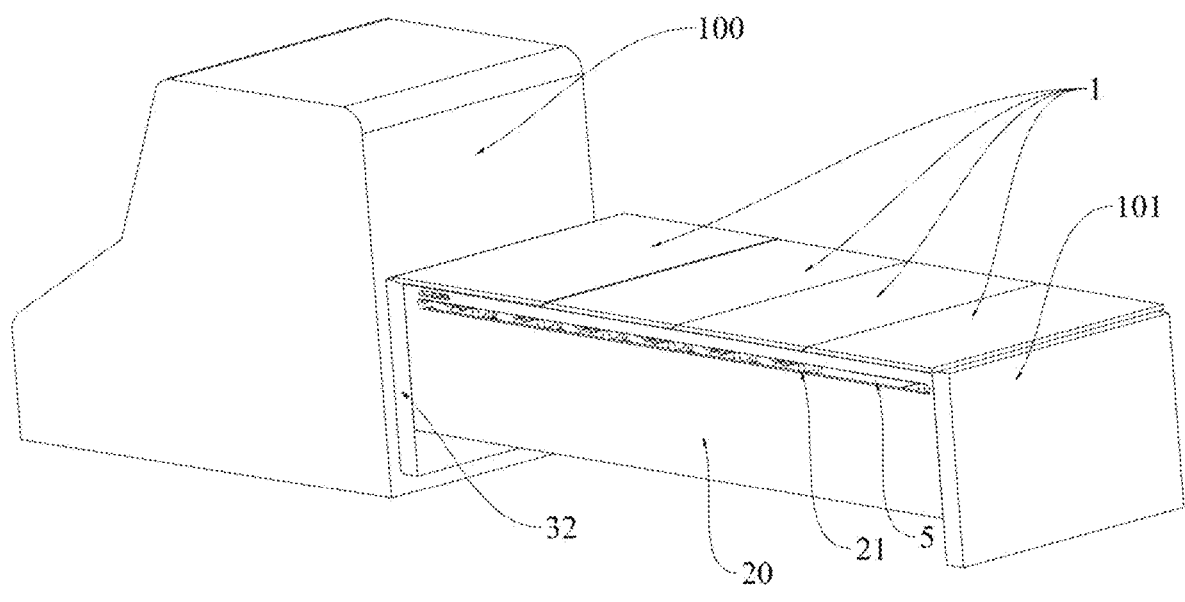
FIG. 1 is a schematic structural diagram of a pickup truck tonneau cover according to an embodiment of the present application.
Figure 2:
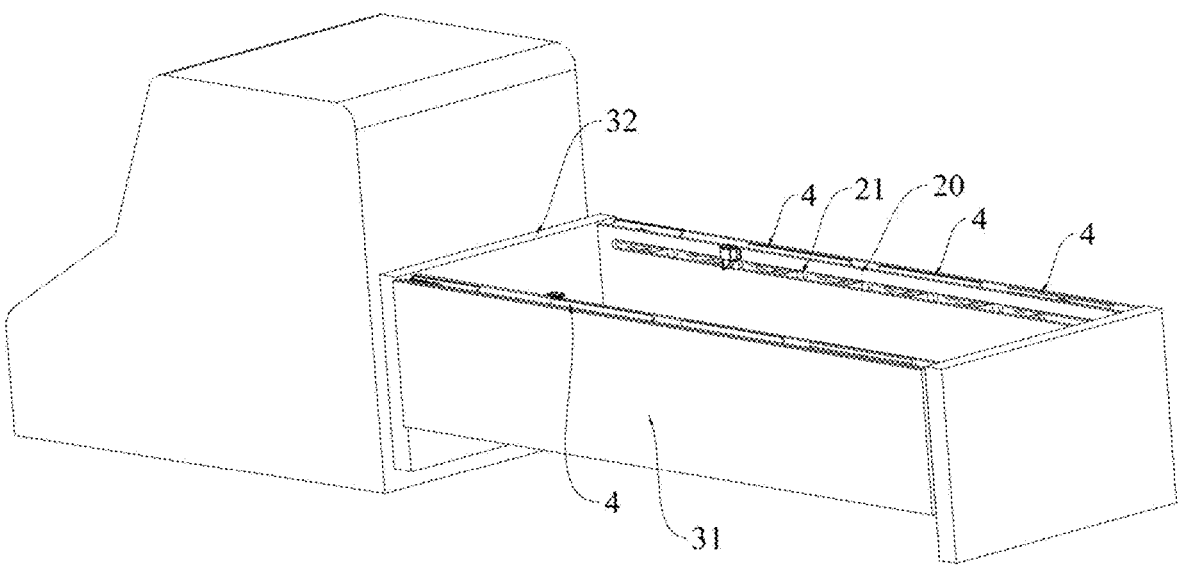
FIG. 2 is a schematic diagram of an installation of the mounting frame of the pickup truck tonneau cover according to an embodiment of the present application.

In order to better explain the present application and facilitate understanding, the present application is described in detail below with reference to the accompanying drawings and specific embodiments. The directional terms "upper", "lower", etc. mentioned herein are based on the orientation of FIG. 1.

Although exemplary embodiments of the present application are shown in the accompanying drawings, it should be understood that the present application can be implemented in various forms and should not be limited by the embodiments set forth herein. Instead, these embodiments are provided to enable a clearer and more thorough understanding of the present application and to fully convey the scope of the present application to those skilled in the art.

As shown in FIG. 1 to FIG. 23, the present application provides a pickup truck tonneau cover, which includes one or a plurality of cover plates 1 and a pair of relatively arranged folding apparatuses 2. The pair of folding apparatuses 2 are detachably connected to the two inner side surfaces of the pickup truck's truck bed, and the folding apparatuses 2 adopt a modular design to facilitate the transportation and disassembly of the pickup truck tonneau cover. The folding apparatus 2 includes a mounting frame 20 and a folding mechanism 21. The mounting frame 20 is provided at the inner side surface of the truck bed through the mounting mechanism, and the folding mechanism 21 is provided inside the mounting frame 20. In an embodiment, the pickup truck tonneau cover further includes a mounting apparatus and a tightening apparatus. The mounting apparatus includes a clamping apparatus, which can reliably clamp the mounting frame 20 to the side wall of the truck bed, thereby fixing the mounting frame 20 to the side frame of the truck bed, which not only ensures the stability of the mounting frame but also facilitates the rapid installation and removal of the tonneau cover. The tightening apparatus is provided at the front of the truck bed, and the two ends of the tightening apparatus are detachably connected to the first ends of the pair of mounting frames 20 adjacent to the cab, respectively. The tightening apparatus can not only further improve the stability of the mounting frame 20 during use, but also improve the convenience of disassembly and assembly of the entire pickup truck tonneau cover.

The folding mechanism 21 can be implemented in a variety of ways, such as a folding connecting rod assembly including multiple connecting rods connected in sequence or their deformations, such as multiple X-shaped fork rods hinged in sequence, multiple X-shaped fork rods partially overlapping and hinged, etc. According to an exemplary embodiment of the present application, the folding mechanism 21 includes a scissor mechanism. In an embodiment of the present application, a plurality of mounting arms 4 are provided on the scissor mechanism, and the mounting arms 4 extend from the top surface of the mounting frame 20. One end of the cover plate 1 is respectively mounted to the corresponding mounting arm 4 on a scissor mechanism, and another end of the same cover plate 1 is respectively mounted to the corresponding mounting arm 4 on another scissor mechanism, so that each cover plate 1 is connected to a pair of corresponding mounting arms 4.

In an embodiment, the top surface height of the mounting frame 20 is lower than or flush with the top surface height of the side wall of the truck bed, so that the center of gravity of the folding apparatus 2 can be lowered and the stability of the vehicle operation can be improved. In addition, by providing the scissor mechanism in the mounting frame 20, the mounting frame 20 can protect the scissor mechanism and prevent items in the truck bed from entering the interior of the scissor mechanism. The scissor mechanism telescopes along the length of the truck bed. This motion can be driven manually or electrically. Manually, one cover plate 1, such as the cover plate 1 at the tailgate 101, can be flipped, thereby causing the other covers 1 to flip synchronously through the scissor mechanism. Alternatively, a motor can be provided to indirectly drive the scissor mechanism through a transmission mechanism such as a lead screw, rocker, cable, or worm gear, multiple drive methods may be adopted. During telescopic operation, the scissor mechanism remains within the mounting frame 20, preventing it from extending beyond the mounting frame 20 and the truck bed, reducing the risk of damage, which also improves the stability of the scissor mechanism's installation and prevents it from falling off during high-speed driving. As the scissor mechanism switches between folded and unfolded positions, the mounting arms 4 move with the scissor mechanism, extending above the mounting frame 20 and the truck bed to prevent interference between the scissor mechanism and the cover plates 1, and interference between the cover plates 1 and the left and right side frames of the truck bed. Multiple mounting arms 4 simultaneously rotate and move laterally in the same direction, driving the rotation and lateral movement of the cover plates 1. In an embodiment, the pickup truck tonneau cover may further include one or more locking mechanisms, which can lock the unfolded state or folded state of the folding bracket, thereby preventing the folding bracket from accidentally switching when the vehicle is moving or under the action of external forces, further improving the safety and reliability of the tonneau cover.

Figure 3:
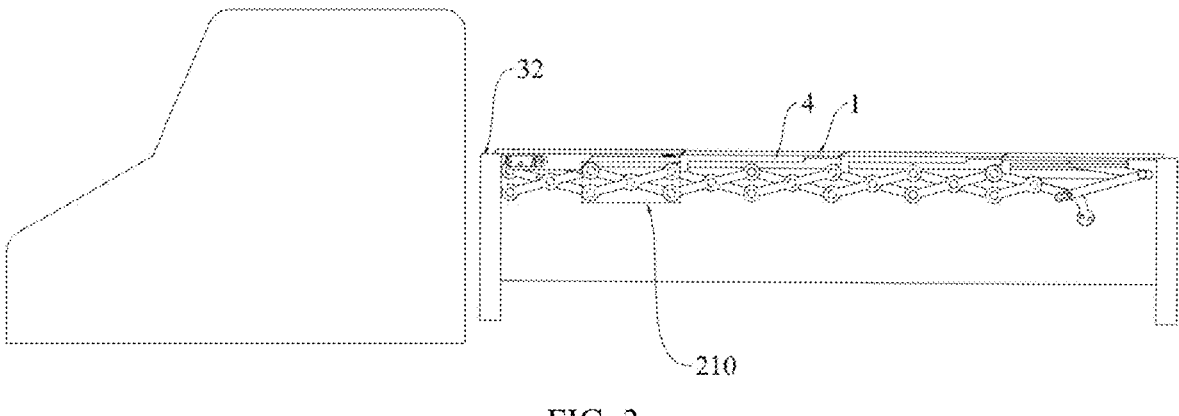
FIG. 3 is a schematic diagram of a scissor mechanism of the pickup truck tonneau cover in an unfolded state according to an embodiment of the present application.
Figure 15:
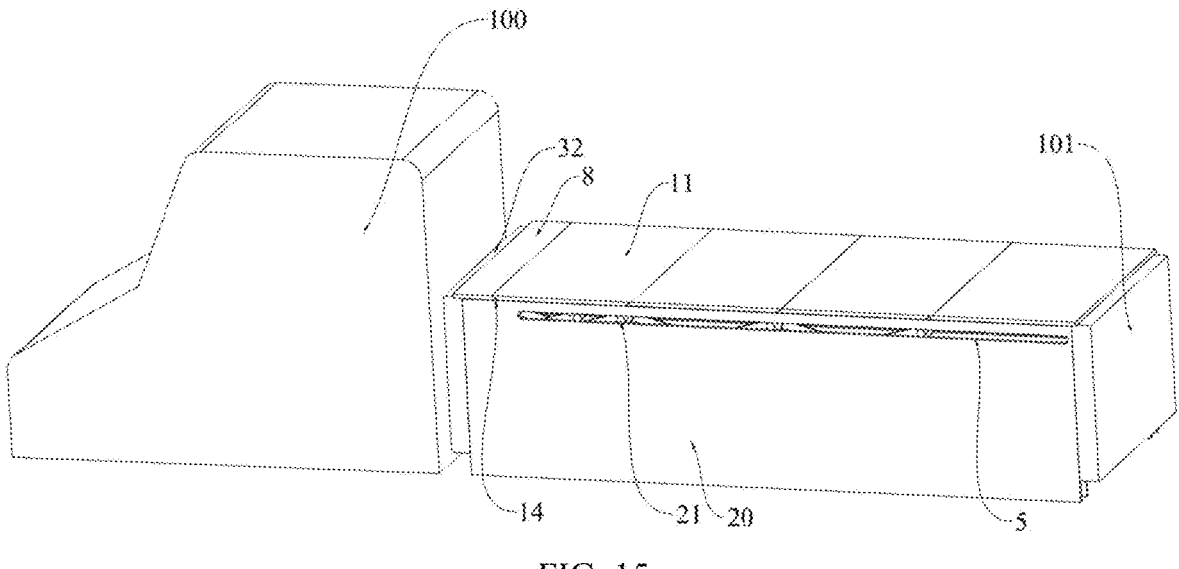
FIG. 15 is a schematic structural diagram of a pickup truck tonneau cover according to an embodiment of the present application.
Figure 20:
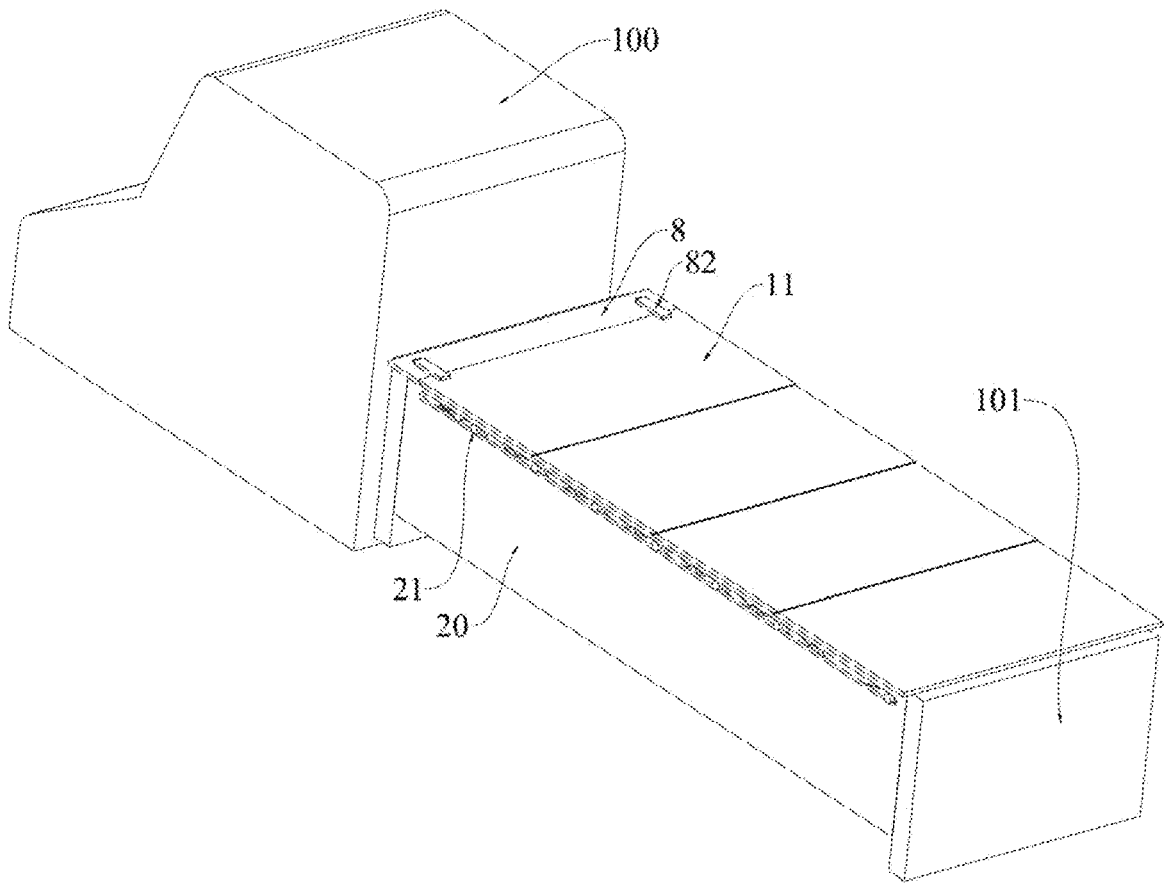
FIG. 20 is a schematic structural diagram of a pickup truck tonneau cover according to an embodiment of the present application.
Figure 21:
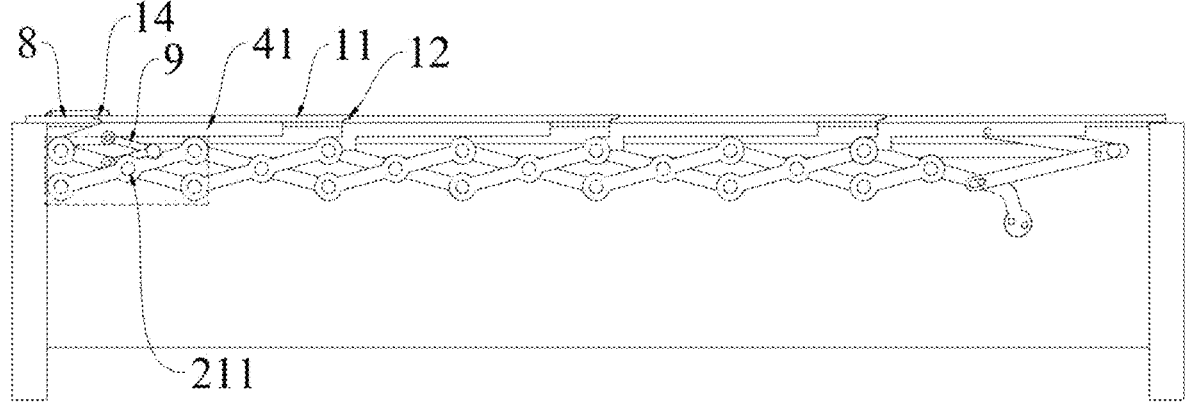
FIG. 21 is a schematic diagram of a scissor mechanism of the pickup truck tonneau cover in an unfolded state according to an embodiment of the present application.
Figure 22:
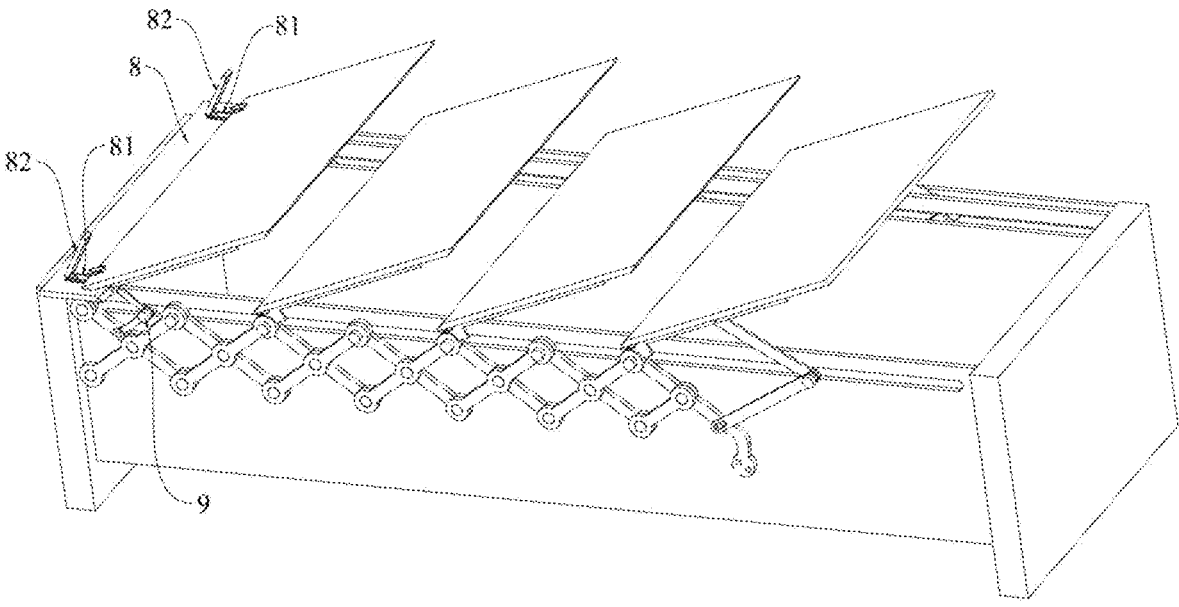
FIG. 22 is a schematic structural diagram of a waterproof plate of a pickup truck tonneau cover according to an embodiment of the present application.
Figure 23:
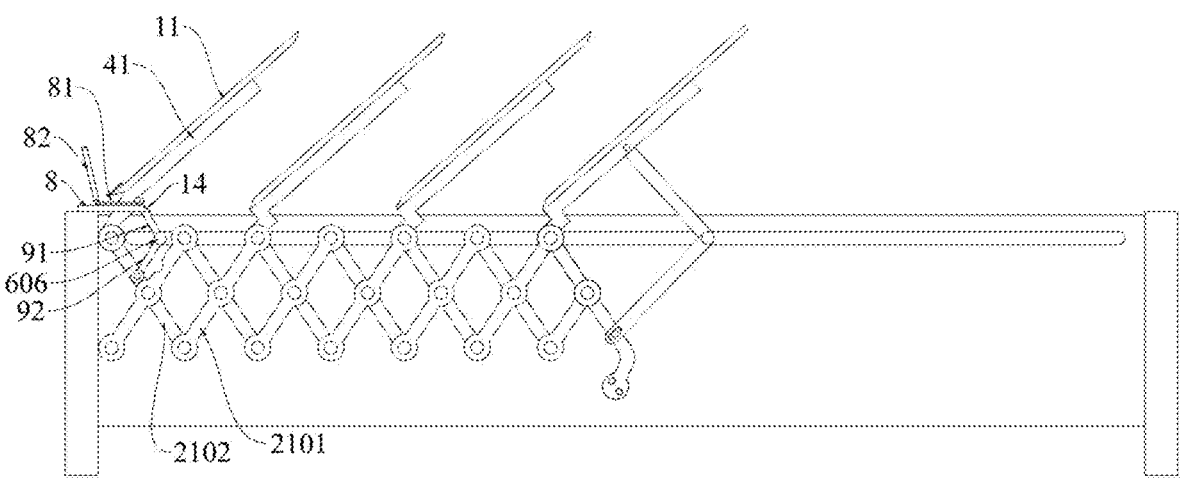
FIG. 23 is a schematic diagram of the scissor mechanism of the pickup truck tonneau cover in a folded state according to an embodiment of the present application.

In an embodiment, as shown in FIG. 3, when the scissor mechanism is in the unfolded state, the mounting arm 4 is in the shape of a straight rod, with its upper end surface flush with the top surface of the truck bed. The lower surface of the cover plate is mounted to the upper end surface of the mounting arm, thereby providing multiple cover plates 1 in a horizontal state and overlapping in sequence to form a flat plate. In other embodiments not shown, the mounting arm may also have other shapes, as long as the cover plates can be provided in a horizontal state when the folding mechanism is unfolded. In an embodiment, as shown in FIG. 1, FIG. 15, or FIG. 20, the area of the flat plate is larger than the area of the truck bed top opening, and the flat plate completely covers the truck bed top opening. For example, the length of the cover plate along the width of the vehicle body can be set to be greater than the distance between the two side walls of the truck bed. Furthermore, the top surface of the truck bed side wall 31 abuts the bottom surface of the flat plate, thereby sealing the truck bed and effectively improving the dust and water resistance of the truck bed. In an embodiment, a waterproof pad, such as a rubber pad, is provided at the abutment between the top surface of the truck bed side wall and the bottom surface of the cover plate. For example, the rubber pad can be provided on the bottom surface of the cover plate in the form of a strip extending along the entire length of the cover plate at a position corresponding to the top surface of the side wall of the truck bed. When the scissor mechanism is in the folded state, the plurality of mounting arms 4 are all tilted and retracted to the front of the truck bed adjacent to the cab 100, thereby causing the plurality of cover plates 1 to be tilted and retracted to the front of the truck bed adjacent to the cab 100. The truck bed is in an open state, thereby increasing the opening area of the truck bed, making it easier to take items, and improving the space utilization of the truck bed.

Since the cover plates need to rotate simultaneously during the linear motion toward the front or tailgate during the folding process of the scissor mechanism, there is a situation where the ends of adjacent cover plates abut against each other and interfere with each other, affecting the rotation of the cover plates. The related art solves this problem by leaving a certain gap between adjacent cover plates, which will lead to a deterioration in the waterproof and sealing properties between the cover plates. The present application adopts a mutually overlapping connection form between the cover plates 1, thereby effectively avoiding the problem of mutual interference between the cover plates 1 when they rotate from a flat state, and the overlapping parts and the provision of seals 13 on the overlapping parts improve the waterproof and dustproof effects between the cover plates 1. The relevant specific structure will be further described in detail in the following specific embodiments.

The mounting frame 20 can be a box-shaped structure, and the inner side and bottom side of the mounting frame 20 facing the truck bed side frame are basically completely closed. The slideway 5 for facilitating the movement of the folding mechanism 21 is provided inside the mounting frame 20, and a strip groove for the mounting arm 4 to extend is provided on the top side, which has the effect of preventing dust and water, and improving the durability of the scissor mechanism.

To avoid ambiguity, the terms "horizontal state" and "non-horizontal state" as used in the present application are relative concepts, both defined with reference to a reference plane formed by the upper surface of the truck bed, which may be understood as the geometric plane defined by the connecting line of the upper edges of the two opposite side walls of the truck bed and its extended surface, rather than by the ground or gravity direction. The term "horizontal state" refers to a state in which the cover plate is parallel or substantially parallel to the reference plane. In this state, the folding mechanism is in an unfolded state, and the plurality of cover plates continuously cover the opening of the truck bed. Minor angular deviations resulting from manufacturing and assembly tolerances, material compression deformation, applied loads, or thermal expansion and contraction are still regarded as "substantially parallel" and fall within the scope of the "horizontal state." Correspondingly, the term "non-horizontal state" refers to any orientation of the cover plate that is not parallel to the reference plane, encompassing all intermediate postures during the transition of the folding mechanism from the fully unfolded state to the folded state and vice versa. These include, but are not limited to, various inclined angles, near-vertical or vertical orientations, partially lifted states, or segmental flipping states. During this process, the cover plates may individually or simultaneously change their orientation relative to the reference plane, and their angles may continuously vary with the telescopic movement of the folding mechanism. In some embodiments of the present application, terms such as "tilted," "vertical," "forward tilted," or "rearward tiled" may be used for ease of description; however, these are merely exemplary descriptions of the "non-horizontal state" and do not limit the range of cover plate orientations. Meanwhile, the expressions "horizontal/non-horizontal" are only intended to define the posture of the cover plates, and do not limit the specific structural form or movement trajectory of the folding mechanism, the mounting arms, or the truck bed.

The present application are described in detail below in combination with multiple embodiments.

Figure 4:
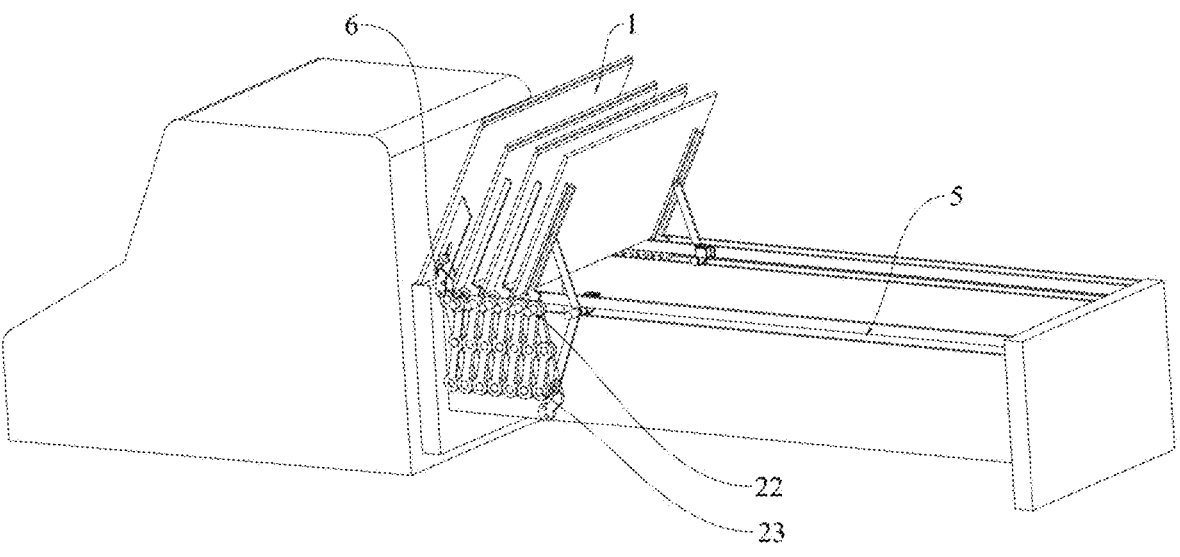
FIG. 4 is a schematic diagram of the scissor mechanism of the pickup truck tonneau cover in a folded state according to an embodiment of the present application.

As shown in FIG. 1 to FIG. 5, for ease of description and reference, it is defined that the tilted state in which the rear end of the cover plate 1 is rotated upward in FIG. 4 as the rearward tilted state of the cover plate 1. The scissor mechanism includes a plurality of intersecting rod assemblies 210 connected in sequence along the length of the truck bed. Among the plurality of intersecting rod assemblies 210, the intersecting rod assembly 210 located at the front end of the scissor mechanism adjacent to the cab 100 is designated as the first intersecting rod assembly 211. The lifting and rotating bracket 6 is installed at the front of the truck bed adjacent to the cab 100. When the existing pickup truck is modified, when the pickup truck tonneau cover is installed, the bottom surface of the cover plate 1 located closest to the front wall 32 of the truck bed abuts against the top surface of the front wall 32 of the truck bed. When the cover plate is opened only by rotation, the bottom surface of the cover plate 1 and the top surface of the front wall 32 interfere with each other, making it impossible to open normally. Therefore, the mounting arm 4 of the present application is connected to the first intersecting rod assembly 211 through the lifting and rotating bracket 6. Under the action of the first intersecting rod assembly 211, the mounting arm 4 rotates and lifts, thereby ensuring that the cover plate 1 closest to the front wall 32 of the truck bed passes over the front wall 32 of the truck bed during the lifting process, avoiding the situation where the cover plate 1 interferes with the front wall 32 of the truck bed when rotating due to the overlapping area of the cover plate 1 being larger than the area of the top opening of the truck bed.

Figure 5:
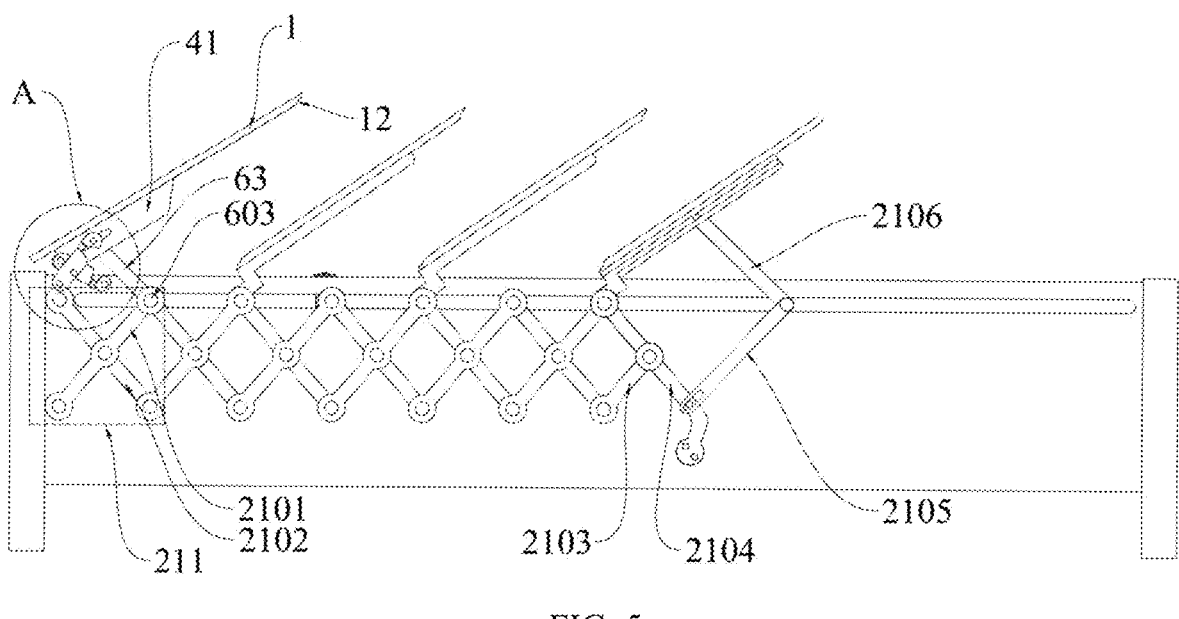
FIG. 5 is a schematic diagram of an installation of the lifting and rotating bracket of the pickup truck tonneau cover according to an embodiment of the present application.

Furthermore, the upper end of one of the support rods of the first intersecting rod assembly 211 is hinged to the mounting frame 20, and the hinge point is located on the extension line of the slideway 5 toward the cab 100. Each intersecting rod assembly 210 includes a first support rod 2101 and a second support rod 2102, each hinged to each other. The hinge point of the first support rod 2101 and second support rod 2102 can be located at the center of the rod body. In adjacent intersecting rod assemblies 210, the first support rod 2101 of one intersecting rod assembly 210 is connected to the second support rod 2102 of the other intersecting rod assembly 210 via an upper hinge shaft 22, while the second support rod 2102 of one intersecting rod assembly 210 is connected to the first support rod 2101 of the other intersecting rod assembly 210 via a lower hinge shaft 23. The mounting frame 20 is provided with a slideway 5 extending along the length of the truck bed. The upper hinge shaft 22 is slidably connected to the slideway 5, providing guidance and limiting for the folding movement of the scissor mechanism. The first intersecting rod assembly 211 is connected to the corresponding first mounting arm 41 of the multiple mounting arms 4 via a lifting and rotating bracket 6. When the scissor mechanism is folded, the pair of support rods of the first intersecting rod assembly 211 pivot relative to each other, and the pair of support rods of the first intersecting rod assembly 211 drive the first mounting arm 41 to rotate and lift or lower the first mounting arm 41 by driving the lifting rotating bracket 6. The other mounting arms 4 except the first mounting arm 41 are directly connected to the first support rod 2101 of the corresponding intersecting rod assembly 210 for mounting the cover plate 1. It should be noted that in some embodiments, the intersecting rod assembly and the mounting arm may be in a one-to-one correspondence, that is, each intersecting rod assembly may be provided with a mounting arm. In other embodiments, the intersecting rod assembly and the mounting arm may not be in a one-to-one correspondence. For example, a mounting arm may be provided for every other intersecting rod assembly, as shown in FIG. 4 and FIG. 5. A mounting arm may also be provided for every two intersecting rod assemblies, and those skilled in the art may set it according to the size of the intersecting rod assembly and the size of the cover plate.

The mounting arm 4 is connected to the first intersecting rod assembly 211 via a lifting and rotating bracket 6. Under the action of the first intersecting rod assembly 211, it rotates and lifts, thereby ensuring that the cover plate 1 closest to the front wall 32 of the truck bed passes over the front wall 32 during the lifting process. This prevents the cover plate 1 from interfering with the front wall 32 of the truck bed during rotation due to the overlapping area of the cover plate 1 being larger than the area of the truck bed top opening.

As shown in FIG. 4 and FIG. 5, except for the mounting arm provided on the first intersecting rod assembly 211, the other mounting arms 4 are connected to the upper end of the first support rod 2101 at the same position on the corresponding intersecting rod assembly. The mounting frame 20 can be box-shaped, with the inner side and bottom side of the mounting frame 20 facing the truck bed side frame being substantially completely enclosed. A slideway 5 facilitating the movement of the scissor mechanism is located within the mounting frame 20. A strip groove is provided on the top side for the mounting arm 4 to extend, providing dust and water resistance and improving the durability of the scissor mechanism. As shown in FIG. 5, the scissor mechanism further includes an auxiliary support frame, which further enhances the stability of the scissor mechanism when the cover is open. Specifically, the auxiliary support frame includes a third support rod 2103, a fourth support rod 2104, a fifth support rod 2105, and a sixth support rod 2106. One end of the third support rod 2103 is hinged to the lower end of the second support rod 2102 in the second intersecting rod assembly 212. The second end of the third support rod 2103 is hinged to the center of the fourth support rod 2104.

The first end of the fourth support rod 2104 is hinged to the upper end of the first support rod 2101 in the second intersecting rod assembly 212. The first end of the sixth support rod 2106 is hinged to the rightmost mounting arm 4. The second end of the fourth support rod 2104 is connected to the waist-shaped hole at the first end of the fifth support rod 2105 via a rotating shaft. The second ends of the fifth and sixth support rods 2105 and 2106 are hinged and then slidably connected to the slideway 5.

Figure 24:
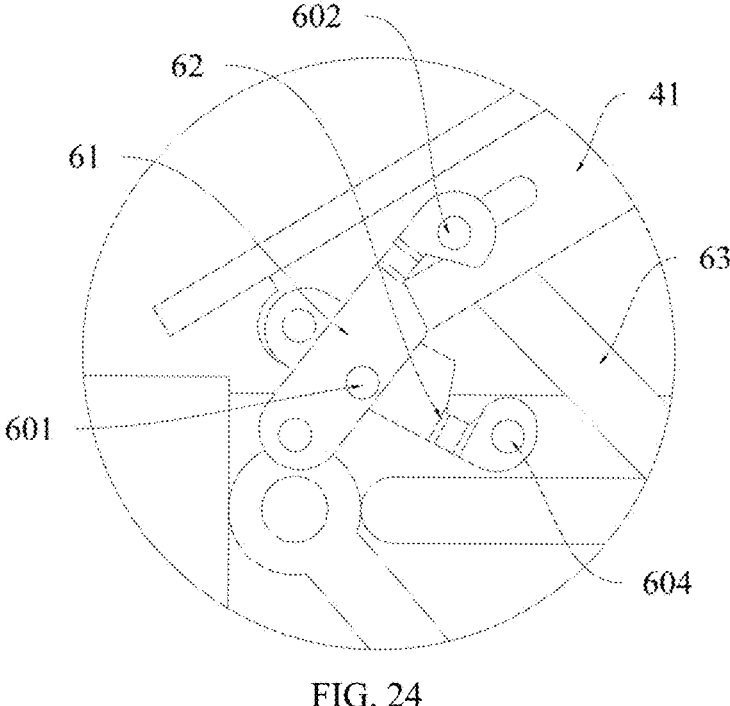
FIG. 24 is an enlarged view of point A in FIG. 5.

As shown in FIG. 24, the lifting and rotating bracket 6 includes a first connecting rod 61, a second connecting rod 62, and a drive connecting rod 63. The first connecting rod 61 and the second connecting rod 62 are hinged via a first pivot 601. The first pivot 601 is offset from the center point of the first connecting rod 61 and is located adjacent to the first end of the first connecting rod 61 (the end facing the cab in FIG. 24). The first pivot 601 is offset from the center point of the second connecting rod 62 and is located adjacent to the first end of the second connecting rod 62 (the end facing the cab in FIG. 24). The first end of the second connecting rod 62 is hinged to the first mounting arm 41. The first end of the drive connecting rod 63 is hinged to the second end of the first connecting rod 61 via a second pivot 602. The second pivot 602 is configured to be slidable relative to the first mounting arm 41, or the drive connecting rod 63 is directly hinged to the first mounting arm 41. The second end of the drive connecting rod 63 is slidably connected to the slideway 5 via a hinged third pivot 603, driving the second end of the drive connecting rod 63 to move along the slideway 5 during movement of the scissor mechanism. In an embodiment, the second end of the drive connecting rod 63 is hinged to the upper end of the second support rod 2102 in the first intersecting rod assembly 211. During movement of the scissor mechanism, the distance between the upper ends of the two support rods in the first intersecting rod assembly 211 changes, driving the second end of the drive connecting rod 63 to move along the slideway 5, thereby rotating the first mounting arm 41 connected to the drive connecting rod 63. The first end of the first connecting rod 61 is hinged to the mounting frame 20, and the second end of the second connecting rod 62 is slidably connected to the mounting frame 20 via a hinged fourth pivot 604. The connection between the first connecting rod 61 and the second connecting rod 62 on the mounting frame 20 is located above the slideway 5. The first connecting rod 61 and the second connecting rod 62 are linked by a hinge point, allowing the first mounting arm 41 to simultaneously rotate about the hinge point and lift, preventing the protruding edge of the cover plate 1 from interfering with the front wall 32 of the truck bed during rotation. The closing process is the reverse of the opening process, thus similarly avoiding interference during closing.

Figure 6:
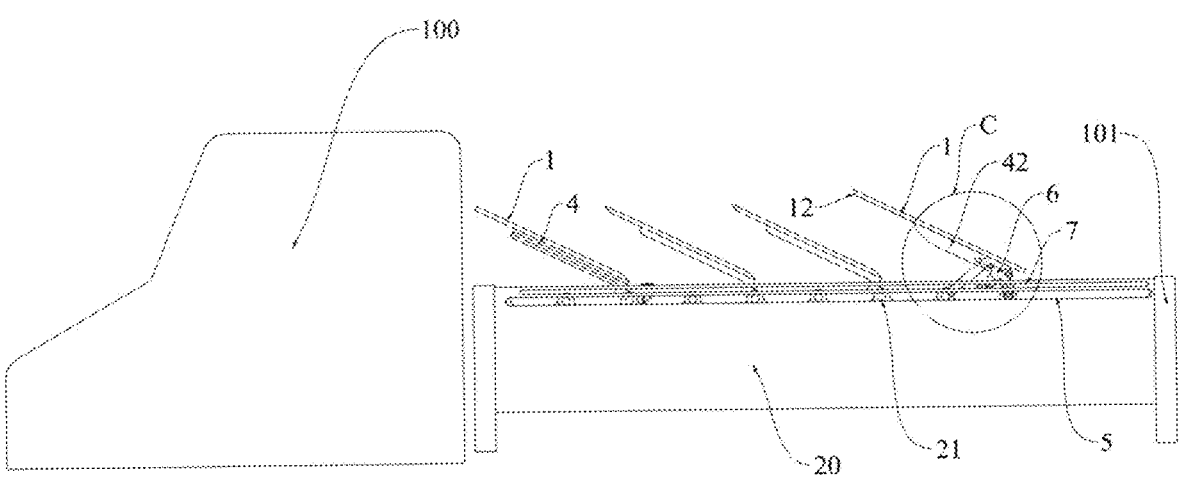
FIG. 6 is a schematic diagram of the scissor mechanism of the pickup truck tonneau cover in a folded state according to an embodiment of the present application.
Figure 7:
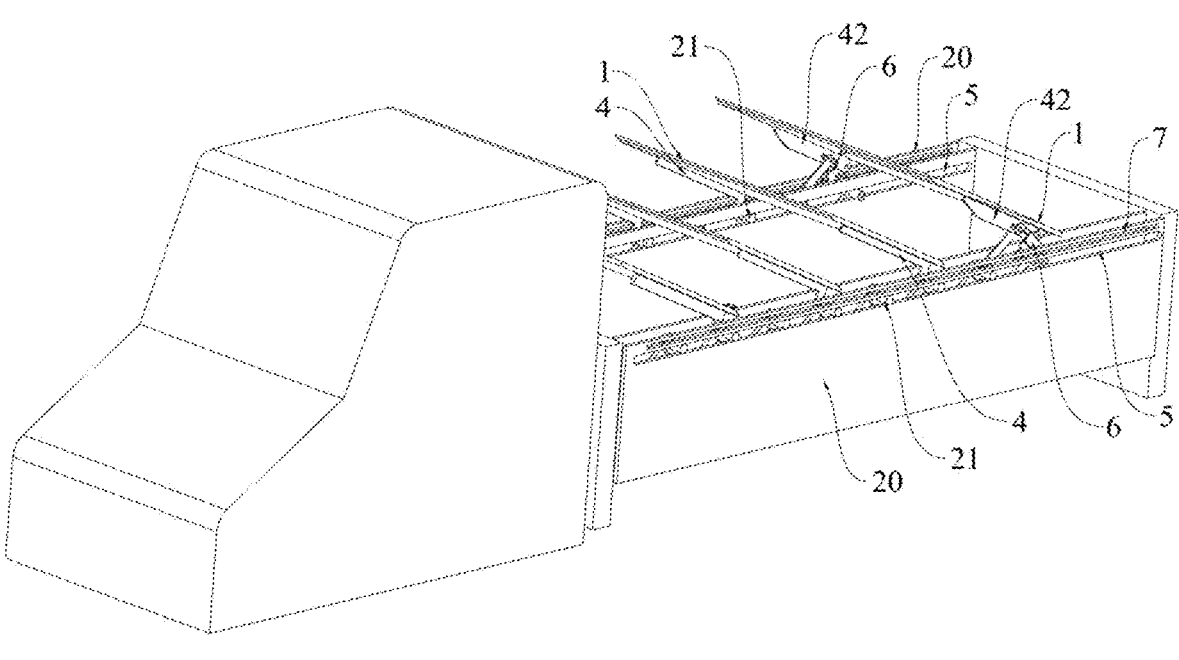
FIG. 7 is a schematic diagram of a three-dimensional structure of the scissor mechanism of the pickup truck tonneau cover in a folded state according to an embodiment of the present application.
Figure 8:
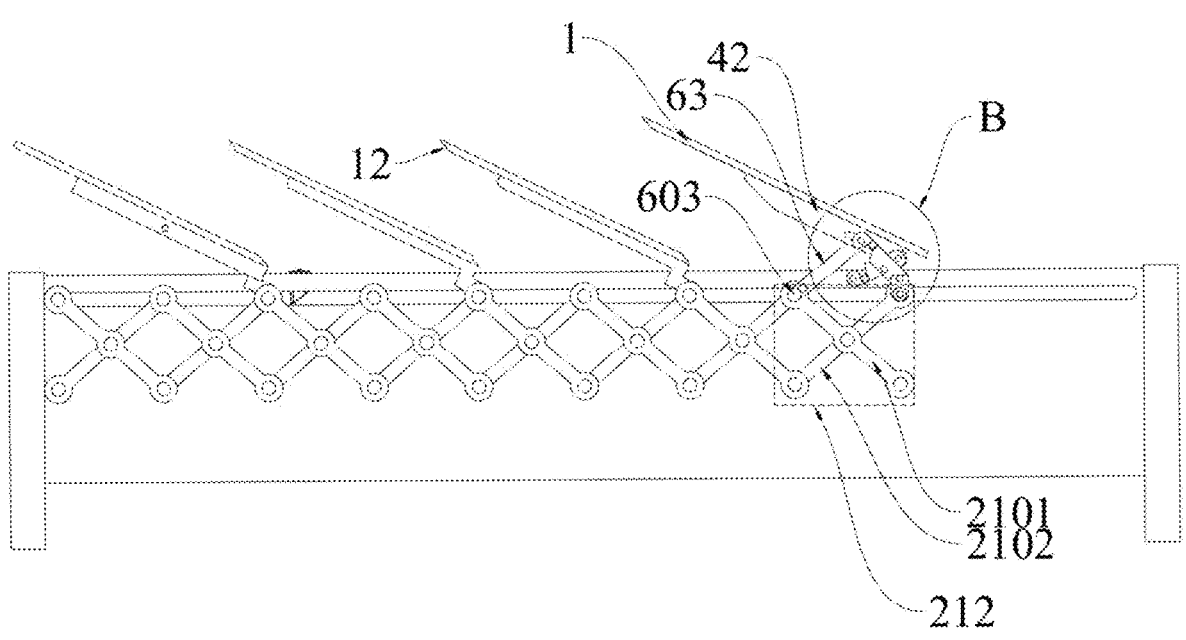
FIG. 8 is a schematic diagram of an installation of the lifting and rotating bracket of the pickup truck tonneau cover according to an embodiment of the present application.

As shown in FIG. 6 to FIG. 8, the scissor mechanism of this embodiment is similar in structure to that of the above embodiment, but the auxiliary support frame is eliminated. For ease of description, it is defined that the tilted state in which the front end of the cover plate 1 in FIG. 6 is rotated upward as the forward tilted state of the cover plate 1. The lifting and rotating bracket 6 is installed at the rear of the truck bed adjacent to the tailgate 101. Among the multiple intersecting rod assemblies 210, the intersecting rod assembly 210 located at the rear end of the scissor mechanism adjacent to the tailgate 101 is defined as the second intersecting rod assembly 212. The upper ends of the two support rods of the second intersecting rod assembly 212 are both slidably connected to the slideway 5 on the mounting frame 20. The second intersecting rod assembly 212 is connected to the corresponding second mounting arm 42 of the multiple mounting arms 4 via a lifting and rotating bracket 6.

When the scissor mechanism is folded, the pair of support rods of the second intersecting rod assembly 212 pivot relative to each other. The pair of support rods of the second intersecting rod assembly 212 drives the lifting and rotating bracket 6 to rotate and lift or lower the second mounting arm 42. Simultaneously, the lifting and rotating bracket 6, driven by the second intersecting rod assembly 212, slides along the slideway 5 toward the front of the truck bed along with the second intersecting rod assembly 212. All mounting arms 4, except the second mounting arm 42, are directly connected to one of a pair of support rods of the corresponding intersecting rod assembly 210. The second mounting arm 42 rotates and rises under the action of the second intersecting rod assembly 212 and the lifting and rotating bracket 6 to prevent the cover plate 1 from interfering with the two side walls and rear of the truck bed during rotation due to the cover plate 1 being larger than the truck bed after being overlapped.

Figure 25:
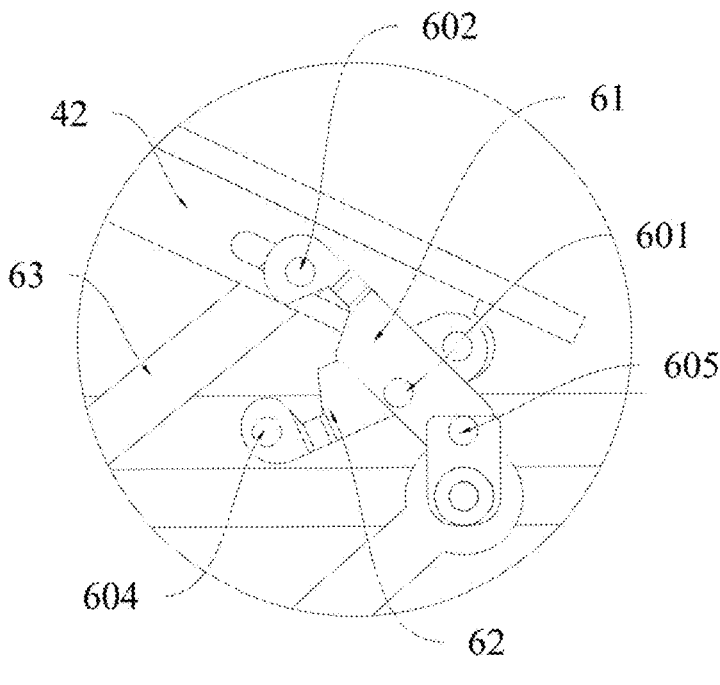
FIG. 25 is an enlarged view of point B in FIG. 8.
Figure 26:
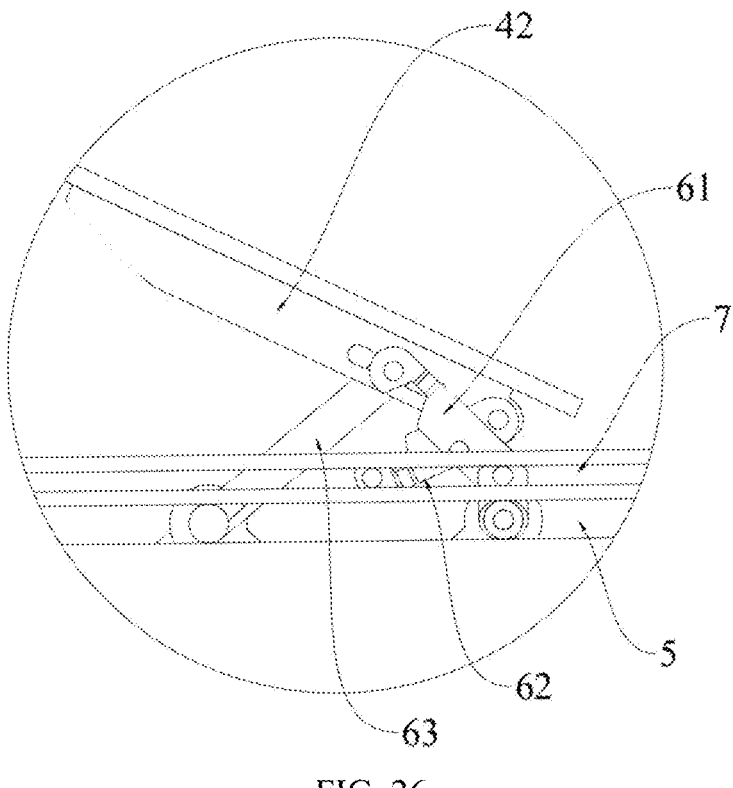
FIG. 26 is an enlarged view of point C in FIG. 6.

Specifically, the structure of the lifting and rotating bracket 6 remains unchanged, while the installation location and method are changed. 25 and 26, the lifting and rotating bracket 6 includes a first connecting rod 61, a second connecting rod 62, and a drive connecting rod 63. The first connecting rod 61 and the second connecting rod 62 are hinged via a first pivot 601. The first pivot 601 is offset from the center point of the first connecting rod 61 and is located adjacent to the first end of the first connecting rod 61 (the end adjacent to the tailgate in FIG. 25). The first pivot 601 is offset from the center point of the second connecting rod 62 and is located adjacent to the first end of the second connecting rod 62 (the end adjacent to the tailgate in FIG. 25). The first end of the second connecting rod 62 is hinged to the second mounting arm 42. The first end of the drive connecting rod 63 is hinged to the second end of the first connecting rod 61 via a second pivot 602. The second pivot 602 is configured to be slidable relative to the second mounting arm 42, or the first end of the drive connecting rod 63 is directly hinged to the second mounting arm 42. The second end of the drive connecting rod 63 is slidably connected to the slideway 5 via a hinged third pivot 603. During the movement of the scissor mechanism, the second end of the drive connecting rod 63 can be driven to move along the slideway 5. In an embodiment, the second end of the drive connecting rod 63 is hinged to the upper end of the first support rod 2101 in the second intersecting rod assembly 212 via the hinged third pivot 603. During the movement of the scissor mechanism, the distance between the upper ends of the two support rods in the second intersecting rod assembly 212 changes, driving the second end of the drive connecting rod 63 to move along the slideway 5, thereby driving the second mounting arm 42 connected to the drive connecting rod 63 to rotate and lift or lower the second mounting arm 42, thereby preventing the cover plate 1 from interfering with the rear end and side walls of the truck bed during opening. As shown in FIG. 26, the mounting frame 20 is provided with a sliding slot 7, which is parallel to the slideway 5 and located above the slideway 5. The second end of the second connecting rod 62 is slidably connected to the sliding slot 7 via a hinged fourth pivot 604. The first end of the first connecting rod 61 is slidably connected to the sliding slot 7 via a hinged fifth pivot 605. The upper end of the first support rod 2102 of the second intersecting rod assembly 212 is connected to the first end of the first connecting rod 61 via a connector. During the movement of the scissor mechanism, the first support rod 2102 of the second intersecting rod assembly 212 drives the first end of the first connecting rod 61 to move synchronously on the sliding slot 7. The sliding slot 7 provides guidance and a limit for the sliding movement of the lifting and rotating bracket 6, enabling the lifting and rotating bracket 6 to move synchronously with the scissor mechanism while ensuring that the movement of the lifting and rotating bracket 6 and the scissor mechanism do not interfere with each other. The second end of the drive connecting rod 63 can be provided with a strip hole, and the third pivot 603 is sleeved in the strip hole to ensure that the tilt angle of the cover plate 1 is consistent after opening.

It should be noted that the terms "slideway" and "sliding slot" in the present application are broadly defined, and encompass groove structures directly formed by machining as well as various linear guiding and limiting mechanisms constituted by additional guide rails, sliding rails, tracks, bushings, and sliding blocks/rollers. The specific shape, material, cross-section, arrangement, and connection manner thereof do not constitute limitations to the scope of protection of the present application.

In an embodiment, the slideway 5 and the sliding slot 7 are provided at the mounting frame 20 and cooperate with the lifting and rotating bracket 6 and its associated connecting rods (for example, the first connecting rod 61, the second connecting rod 62, and the drive connecting rod 63) to provide linear guidance and stroke limitation during the entire unfolding and folding process of the scissor mechanism. The slideway 5 and the sliding slot 7 may be configured as longitudinally extending through-slots, such that relevant pivots or sliding blocks can slide therein along the length direction of the mounting frame 20. However, the slideway 5 and the sliding slot 7 are not limited to the form of through-slots. Any structure that can achieve equivalent guiding and limiting functions shall be regarded as an equivalent solution of the present application.

In an embodiment, the slideway 5 and the sliding slot 7 may be directly machined on the mounting frame 20 to form recessed grooves, through-slots, stepped grooves, or composite cross-section grooves; alternatively, the guiding structure may be realized by additional components, such as fixing profile rails, T-slots, dovetail slots, C-shaped or U-shaped tracks, angle steel rails, embedded sliding rail components, extruded aluminum rails, or cold-bent steel rails onto the mounting frame 20, or integrating them with the mounting frame 20 by means of embedding, riveting, screwing, welding, or bonding. The cross-section of the rails may be rectangular, arc-shaped, trapezoidal, dovetail-shaped, T-shaped, or other suitable cross-sections; the guiding surface may be a bare metal surface, or it may be provided with a low-friction liner or a wear-resistant strip, such as PTFE, POM, nylon, composite wear-resistant layers, or replaceable wear-resistant inserts, so as to reduce wear and facilitate maintenance.

In an embodiment, the sliding cooperation members may adopt a sliding block-rail pair, a roller-track pair, a ball-circulation linear guide pair, or a sliding shoe-groove pair, and may also adopt the form of a sliding pin with a bushing sliding in the groove. The structure may be open, or may be configured as a closed or semi-closed cover structure to resist the intrusion of dust, rain, snow, and debris. Drain holes, flow channels, or sealing strips may be arranged at the bottom of the grooves or at low positions of the tracks. To improve the operating quality of the mechanism, preloading, clearance compensation, or lubrication devices may be provided in the guide pair, and grease cups, oil-containing bushings, or self-lubricating materials may be employed to reduce noise and friction. In addition, to enhance durability, replaceable wear-resistant liners may be provided on the guiding surfaces, and consumable parts may be designed as modular quick-replacement components.

Figure 9:
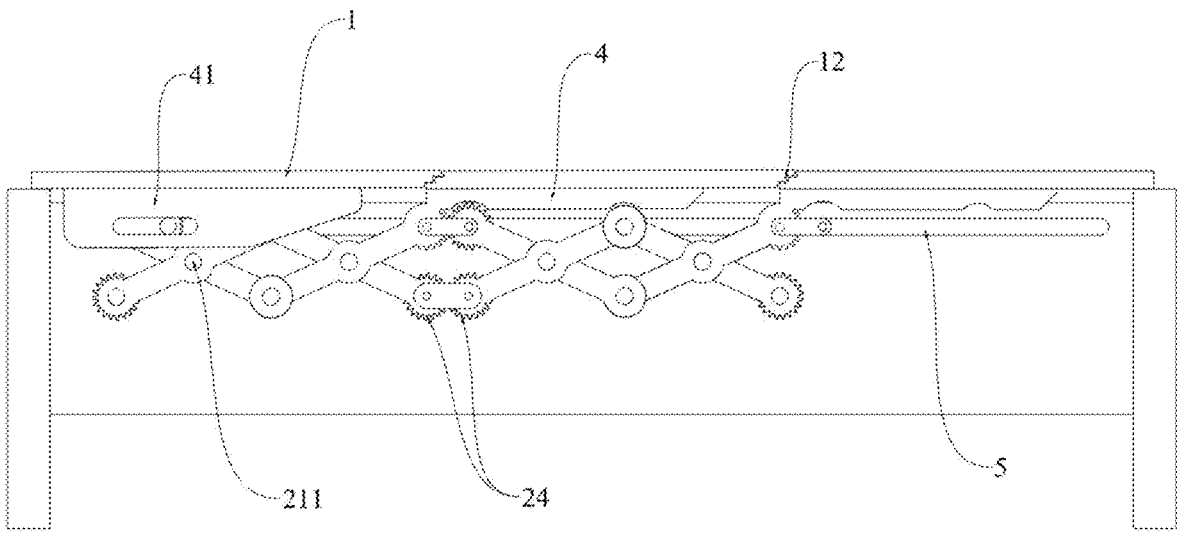
FIG. 9 is a schematic diagram of a scissor mechanism of the pickup truck tonneau cover in an unfolded state according to an embodiment of the present application.
Figure 10:
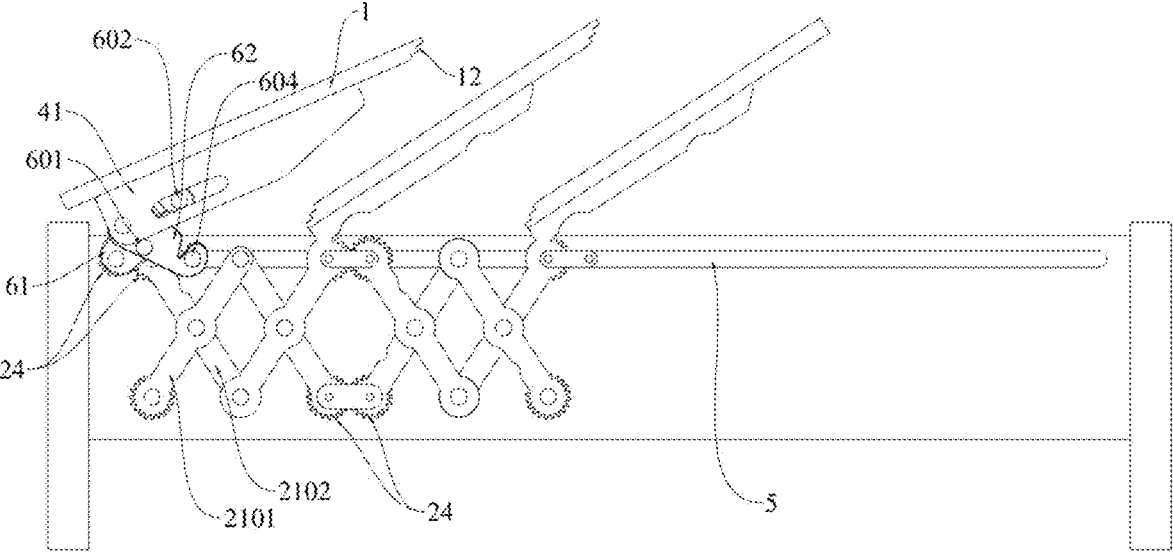
FIG. 10 is a schematic diagram of the scissor mechanism of the pickup truck tonneau cover in a folded state according to an embodiment of the present application.

As shown in FIG. 9 and FIG. 10, the embodiment shows the case where the cover plate 1 is opened in a rearward tilting position, and the lifting and rotating bracket 6 is installed at the front of the truck bed adjacent to the cab 100. Similar to the previous embodiments, the scissor mechanism includes a plurality of intersecting rod assemblies 210 connected in sequence along the length of the truck bed, and each intersecting rod assembly 210 includes a pair of mutually hinged support rods. The difference between this embodiment and the above embodiments is that the ends of the two support rods of adjacent intersecting rod assemblies 210 are meshed by gears 24, and the rotating shafts or central axes of the two meshing gears 24 are connected together by a connecting member, which is slidably connected to the slideway 5, and the two maintain synchronous sliding. The form of the gear 24 includes an independent gear provided at the end of the support rod or a gear structure formed integrally at the end of the support rod.

The mounting frame 20 is provided with a slideway 5 arranged along the length of the truck bed, and the rotating shafts or central axes of the pair of gears 24 at the upper end are both configured to move along the slideway 5. Among the multiple intersecting rod assemblies 210, the intersecting rod assembly 210 located at the front end of the scissor mechanism adjacent to the cab 100 is defined as the first intersecting rod assembly 211. The upper end of the second support rod 2102 of the first intersecting rod assembly 211 is hinged to the mounting frame 20, and the hinge point is located at the end of the slideway 5 adjacent to the cab 100. The first intersecting rod assembly 211 is connected to the corresponding first mounting arm 41 among the multiple mounting arms 4 through the lifting and rotating bracket 6. When the scissor mechanism is folded, the pair of support rods of the first intersecting rod assembly 211 pivot relative to each other, where the second support rod 2102 of the first intersecting rod assembly 211 drives the lifting and rotating bracket 6 to drive the first mounting arm 41 to rotate and lift or lower the first mounting arm 41. Except for the first mounting arm 41, the other mounting arms 4 are directly connected to the first support rod 2101 of the corresponding intersecting rod assembly 210. The first mounting arm 41 rotates and rises under the action of the first intersecting rod assembly 211, passing over the front wall 32 of the truck bed, thereby preventing the cover plate 1 from interfering with the front wall 32 of the truck bed during rotation due to the cover plate 1 being larger than the truck bed after overlapping.

Specifically, between two adjacent fork rod assemblies, the upper end of the first support rod 2101 of one fork rod assembly is meshed with the upper end of the second support rod 2102 of the other fork rod assembly via a gear 24. The rotating shafts or central axes of the two gears 24 are slidably disposed on the slideway 5 and are connected with each other via a connector to maintain meshing, and the two maintain synchronous sliding. When the scissor mechanism is in the unfolded state, the distance from the connector to the cover plate 1 is greater than the distance from the connector to the top surface of the mounting frame 20 on both sides of the truck bed, thereby avoiding interference.

The lifting and rotating bracket 6 includes a first connecting rod 61 and a second connecting rod 62, and the first connecting rod 61 and the second connecting rod 62 are hinged via a first pivot 601. The first pivot 601 is offset from the center point of the first connecting rod 61 and is located adjacent to the first end of the first connecting rod 61. The first pivot 601 is also offset from the center point of the second connecting rod 62 and is located adjacent to the first end of the second connecting rod 62. The second end of the first connecting rod 61 is slidably connected to the first mounting arm 41 via a hinged second pivot 602, and the first end of the second connecting rod 62 is hinged to the first mounting arm 41. The first end of the first connecting rod 61 is hinged to the mounting frame 20, and the hinged position is located on the extension line of the slideway 5. The second end of the second connecting rod 62 is slidably connected to the slideway 5 via a hinged fourth pivot 604. The upper end of the second support rod 2102 of the first intersecting rod assembly 211 is hinged to the mounting frame 20 and meshes with the first end of the first connecting rod 61 via a gear 24. The gear 24 structure can be integrally processed with the support rod, or a separate gear 24 can be fixed to the end of the support rod. During the folding process of the first scissor mechanism, the second support rod 2102 of the first intersecting rod assembly 211 rotates with the hinge shaft at the upper end as the rotation axis, and drives the first connecting rod 61 to rotate through the gear 24, thereby realizing the rotation and lifting movement of the first mounting arm 41, avoiding the protruding edge of the cover plate 1 from interfering with the front wall 32 of the truck bed when the cover plate 1 rotates.

Figure 11:
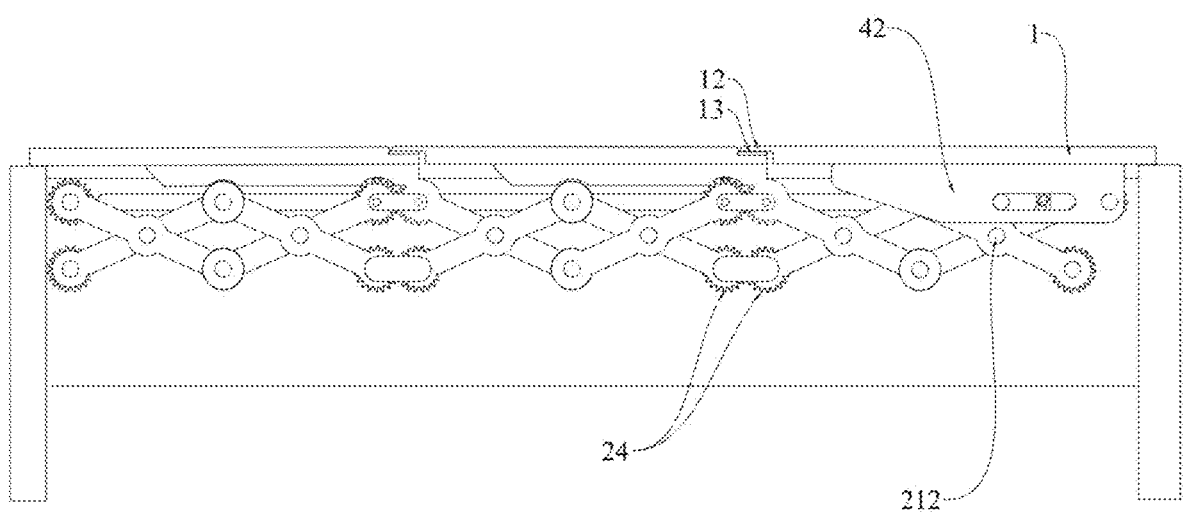
FIG. 11 is a schematic diagram of a scissor mechanism of the pickup truck tonneau cover in an unfolded state according to an embodiment of the present application.
Figure 12:
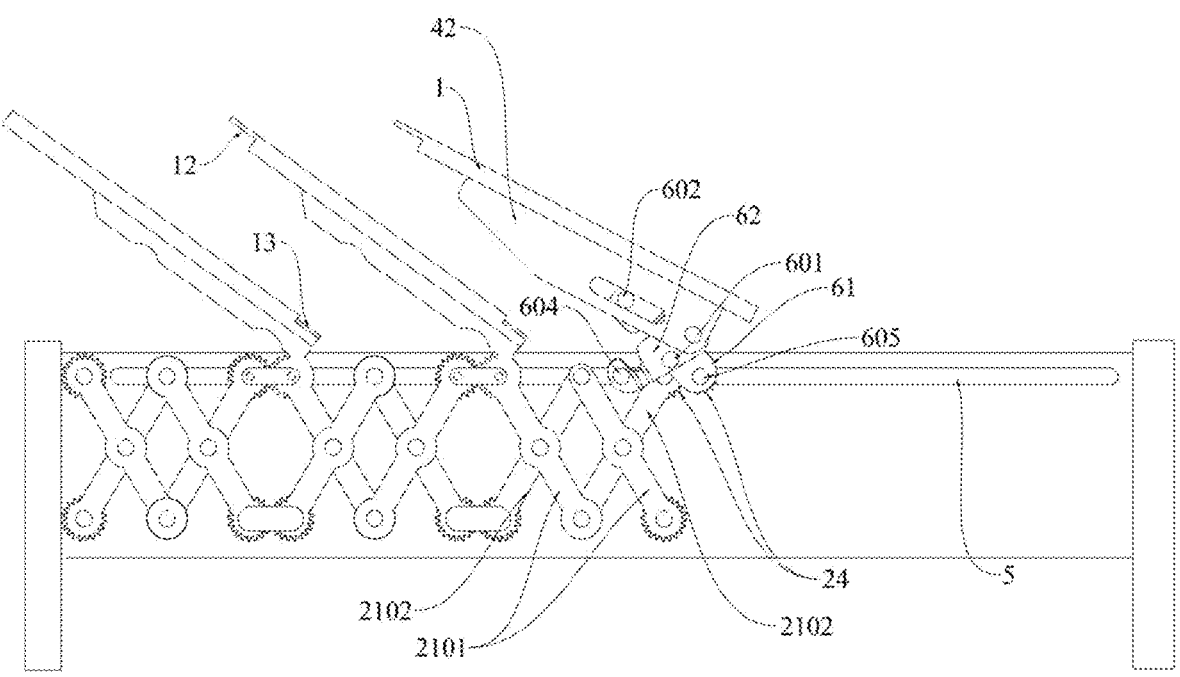
FIG. 12 is a schematic diagram of the scissor mechanism of the pickup truck tonneau cover in a folded state according to an embodiment of the present application.

As shown in FIG. 11 and FIG. 12, this embodiment is similar to the above embodiment in structure, except that in this embodiment the cover plate 1 is folded in a forward tilting posture, and the lifting and rotating bracket 6 is installed at the rear of the truck bed adjacent to the tailgate 101.

The scissor mechanism includes a plurality of intersecting rod assemblies 210 connected in sequence along the length of the truck bed. Each intersecting rod assembly 210 includes a pair of mutually hinged support rods. The ends of the two support rods of adjacent intersecting rod assemblies 210 are meshed by gears 24. The rotating shafts or central axes of the two meshing gears 24 are connected together by a connector, and the two maintain synchronous sliding. The form of the gear 24 includes an independent gear provided at the end of the support rod or a gear structure formed integrally at the end of the support rod. A slideway 5 arranged along the length of the truck bed is provided on the mounting frame 20. The rotating shafts or central axes of the pair of gears 24 at the upper end are both configured to move along the slideway 5. Among the plurality of intersecting rod assemblies 210, the intersecting rod assembly 210 located at the rear end of the scissor mechanism adjacent to the tailgate 101 positions the second intersecting rod assembly 212. The upper ends of the two support rods of the second intersecting rod assembly 212 are both slidably connected to the slideway 5 on the mounting frame 20. The second intersecting rod assembly 212 is connected to the corresponding second mounting arms 42 of the plurality of mounting arms 4 via the lifting and rotating bracket 6.

When the scissor mechanism is folded, the pair of support rods of the second intersecting rod assembly 212 pivot relative to each other. The second support rod 2102 of the second intersecting rod assembly 212 drives the lifting and rotating bracket 6 to rotate and lift or lower the second mounting arm 42. Simultaneously, the lifting and rotating bracket 6, driven by the second intersecting rod assembly 212, slides along the slideway 5 toward the front of the truck bed along with the second intersecting rod assembly 212. The mounting arms 4, except for the second mounting arm 42, are directly connected to the first support rod 2101 of the corresponding intersecting rod assembly 210. The second mounting arm 42 rotates and lifts under the action of the second intersecting rod assembly 212, preventing the cover plate 1 from interfering with the rear frame of the truck bed during rotation due to the cover plate 1 being larger than the truck bed after being overlapped.

Specifically, the structure of the lifting and rotating bracket 6 is the same as that of the above embodiment. The lifting and rotating bracket 6 includes a first connecting rod 61 and a second connecting rod 62. The first connecting rod 61 and the second connecting rod 62 are hinged via a first pivot 601. The first pivot 601 is offset from the center point of the first connecting rod 61 and adjacent to the first end of the first connecting rod 61. The first pivot 601 is offset from the center point of the second connecting rod 62 and adjacent to the first end of the second connecting rod 62. The second end of the first connecting rod 61 is slidably connected to the second mounting arm 42 via the hinged second pivot 602. The first end of the second connecting rod 62 is hinged to the second mounting arm 42. The second end of the second connecting rod 62 is slidably connected to the slideway 5 via the hinged fourth pivot 604, and the first end of the first connecting rod 61 is slidably connected to the slideway 5 via the hinged fifth pivot 605. The upper end of the second support rod 2102 of the second intersecting rod assembly 212 is slidably connected to the slideway 5 via the hinged pivot and is meshed with the first end of the first connecting rod 61 via the gear 24. The meshed ends are connected with each other via a connecting member and remain in meshed state. The two maintain synchronous sliding. During the rotation of the second support rod 2102 of the second intersecting rod assembly 212, the first connecting rod 61 is driven to rotate via the gear 24. At the same time, since the second support rod 2102 of the second intersecting rod assembly 212 itself moves along the slideway 5, the lifting and rotating bracket 6 slides synchronously with the second support rod 2102 of the second intersecting rod assembly 212.

Figure 13:
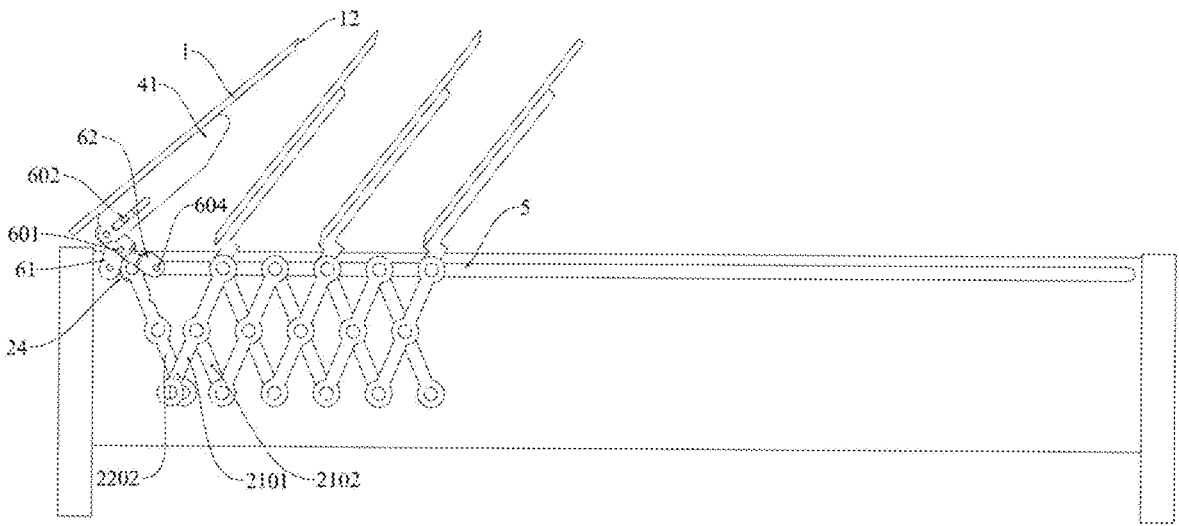
FIG. 13 is a schematic diagram of the scissor mechanism of the pickup truck tonneau cover in a folded state according to an embodiment of the present application.

As shown in FIG. 13, this embodiment is a rearward-tilting structure of the cover plate 1, and the lifting and rotating bracket 6 is installed at the front of the truck bed adjacent to the cab 100. The scissor mechanism of this embodiment is the same as that of the above embodiment, and the connection between the scissor mechanism and the lifting and rotating bracket 6 is similar to that of the above embodiment, except that the first intersecting rod assembly 211 is simplified or replaced by a support rod 2202, and the lower end of the support rod 2202 is hinged to the lower end of the first support rod 2101 of the adjacent intersecting rod assembly 210, and the hinge point is located between the end and the center point of the rod body, thereby achieving the size adjustment of the cover plate 1 in the length direction of the truck bed. The upper end of the support rod 2202 is hinged to the mounting frame 20 and meshes with the first end of the first connecting rod 61 through the gear 24. The gear structure can be processed integrally with the support rod, or a separate gear 24 can be fixed to the end of the support rod. During the folding process of the scissor mechanism, the support rod 2202 rotates with the hinge shaft at the upper end as the rotation axis, and drives the first connecting rod 61 to rotate through the gear 24, thereby realizing the rotation and lifting movement of the first mounting arm 41.

Figure 14:
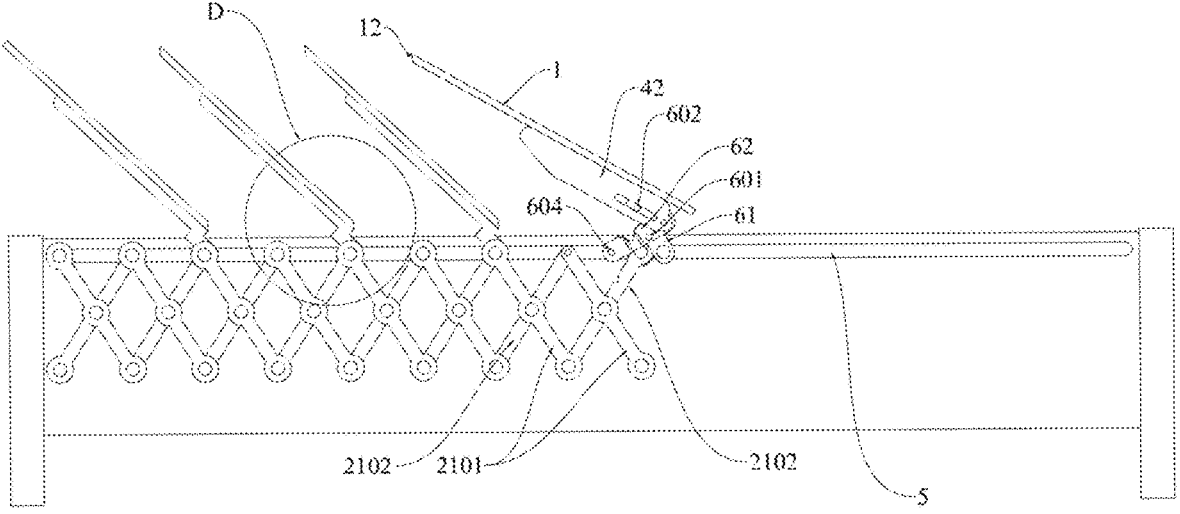
FIG. 14 is a schematic diagram of the scissor mechanism of the pickup truck tonneau cover in a folded state according to an embodiment of the present application.
Figure 27:
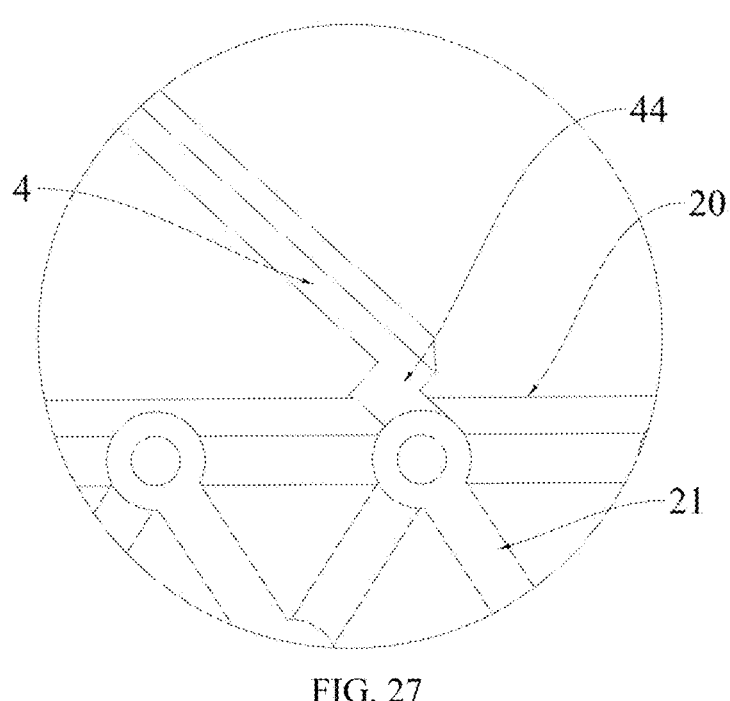
FIG. 27 is an enlarged view of point D in FIG. 14.

As shown in FIG. 14, the structure of the scissor mechanism is similar to that of the above embodiment. The lifting and rotating bracket 6 is mounted at the rear of the truck bed adjacent to the tailgate 101. The difference lies in the installation and driving method of the lifting and rotating bracket 6, which is the same as that of the above embodiment. As shown in FIG. 27, the ends of the mounting arms 4 other than the first mounting arm 41 connected to the corresponding support rods are provided with Z-shaped or similar connecting structure bent parts 44. This extends the distance between the mounting arms 4 and the upper ends of the support rods. When the scissor mechanism is in the unfolded state, the upper ends of the support rods are located outside the projection of the mounting arms 4 connected thereto on the plane of the truck bed top surface. This prevents the cover plate connected to the mounting arms 4 from interfering with the top surface of the truck bed or the mounting frame 20 during rotation.

Figure 16:
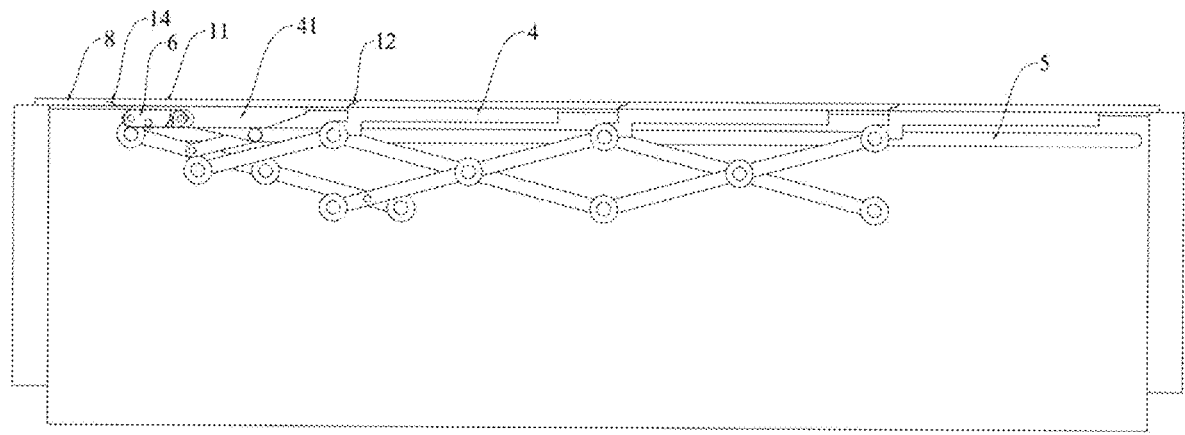
FIG. 16 is a schematic diagram of a scissor mechanism of the pickup truck tonneau cover in an unfolded state according to an embodiment of the present application.
Figure 17:
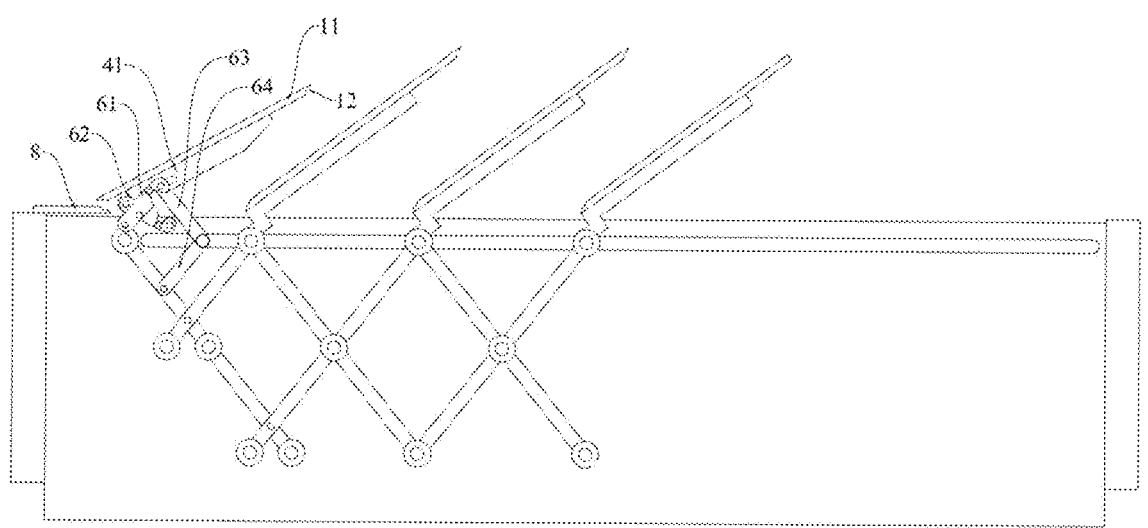
FIG. 17 is a schematic diagram of the scissor mechanism of the pickup truck tonneau cover in a folded state according to an embodiment of the present application.

As shown in FIG. 15 to FIG. 17, this embodiment shows the case where the cover plate 1 is opened in a rearward tilting posture, and the lifting and rotating bracket 6 is installed at the front of the truck bed adjacent to the cab 100. The intersecting rod assembly 210 includes two mutually hinged first support rods 2101 and second support rods 2102. Except for the first intersecting rod assembly 211, the hinge points of the two support rods of the other intersecting rod assemblies 210 are all located at the center of the rod body. The first intersecting rod assembly 211 adopts a deformable structure, where the first support rod 2101 of the first intersecting rod assembly 211 is connected to the first mounting arm 41, and the second support rod 2102 of the first intersecting rod assembly 211 is connected to the drive connecting rod 63 via the linkage connecting rod 64. The upper end of the second support rod 2102 of the first intersecting rod assembly 211 is hinged to the mounting frame 20, and the hinge point is located on the extension line of the slideway 5. The hinge point of the first support rod 2101 and the second support rod 2102 is offset from the center point of the second support rod 2102 and adjacent to the upper end of the second support rod 2102. When the first intersecting rod assembly 211 is hinged to the adjacent intersecting rod assembly 210, the intersection of the second support rod 2102 and the first support rod 2101 deviates from the lower end of the bar body, and the hinge point is located between the center and the lower end of the bar body.

As shown in FIG. 16 and FIG. 17, this embodiment includes a waterproof plate 8 on the front wall 32 of the truck bed. The structure of the lifting and rotating bracket 6 is the same as that of the above embodiment, except that the second end of the drive connecting rod 63 is hinged to the upper end of the linkage connecting rod 64 via a hinge shaft, which is slidably disposed on the slideway 5, and the lower end of the linkage connecting rod 64 is hinged to the second support rod 2102 of the first intersecting rod assembly 211. During the movement of the scissor mechanism, the second support rod 2102 of the first intersecting rod assembly 211 rotates, driving the linkage connecting rod 64 to rotate, thereby driving the drive connecting rod 63 to rotate via the hinge shaft with the drive connecting rod 63. The drive connecting rod 63 then links with the first mounting arm 41 to achieve simultaneous lifting and rotation of the first mounting arm 41. When the scissor mechanism is unfolded, a second lapping part 14 is formed between the first cover plate 11 and the waterproof plate 8, located at the front end of the truck bed adjacent to the cab 100. Matching inclined surfaces, stepped surfaces, or curved surfaces are formed at the ends of the second lapping part 14. Sealing strips, such as those made of rubber or silicone, can be provided on these matching inclined surfaces, stepped surfaces, or curved surfaces to enhance the waterproof seal between the waterproof plate 8 and the cover plate. Furthermore, the waterproof plate 8 increases the distance between the first cover plate 11 and the front wall 32 of the truck bed, preventing interference between the first cover plate 11 and the front wall 32 of the truck bed during its lifting and rotation.

Compared to the above embodiment, the two support rods in the intersecting rod assembly 210 of the scissor mechanism are longer, so each intersecting rod assembly can be equipped with a corresponding mounting arm. Directly connecting the first intersecting rod assembly 211 to the upper hinge axis of the adjacent intersecting rod assembly would make the drive connecting rod 63 too long, affecting stability. Therefore, it is necessary to change the connection position of the lower end of the drive connecting rod 63, and thus add a linkage connecting rod 64 to achieve linkage between the second support rod 2102 of the first intersecting rod assembly 211 and the drive connecting rod 63. In this embodiment, the height of the mounting frame 20 is greater, which can increase the stability of its installation on the inner wall surface of the cab. It is understood that if the height of the side wall of the truck bed is smaller, the intersecting rod assembly composed of shorter support rods in the previous embodiment can be used. Therefore, by adjusting the quantity of fork rod assemblies in this embodiment, the size of the mounting frame 20 can be effectively changed. In addition, by adjusting the hinge point position of the intersecting rod assembly 210, the distance between the upper ends of the two support rods can be effectively changed. The cover plate 1 is connected to the first rod of each pair of intersecting rod assemblies 210 through a pair of mounting arms 4, thereby adjusting the size of the cover plate 1 in the length direction of the truck bed.

Figure 18:
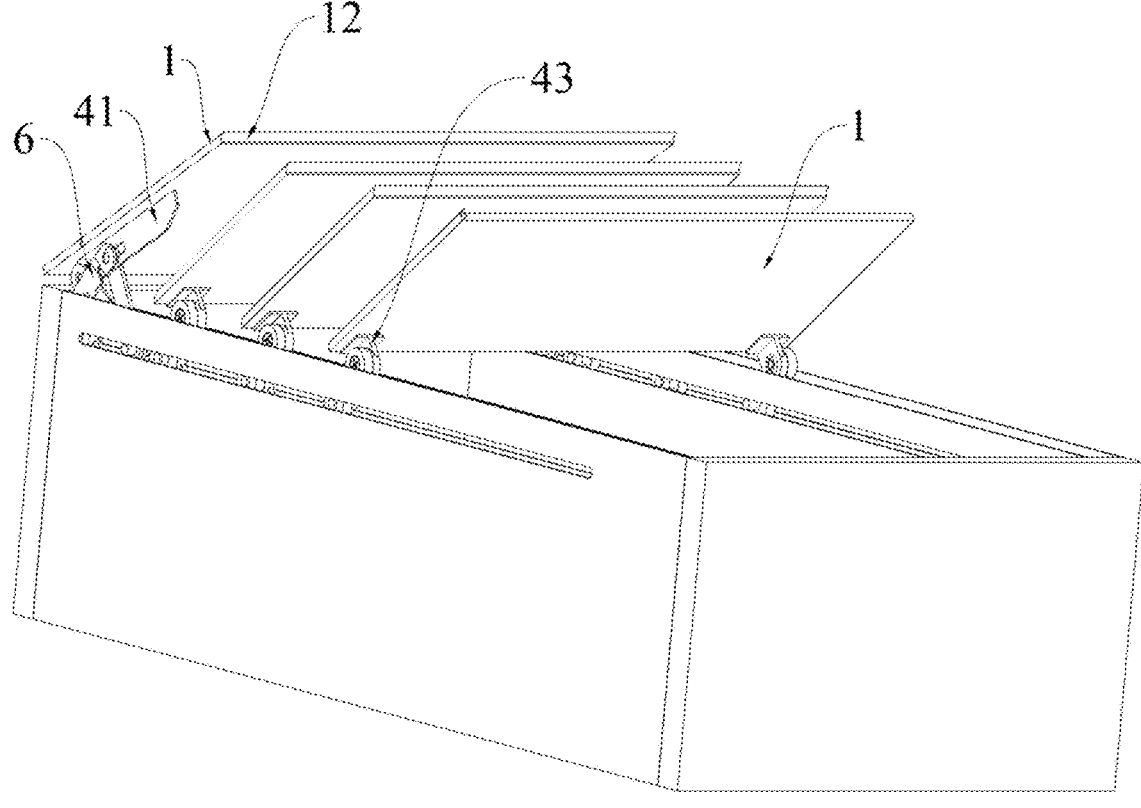
FIG. 18 is a schematic diagram of the installation of a cover plate of the pickup truck tonneau cover according to an embodiment of the present application.
Figure 19:
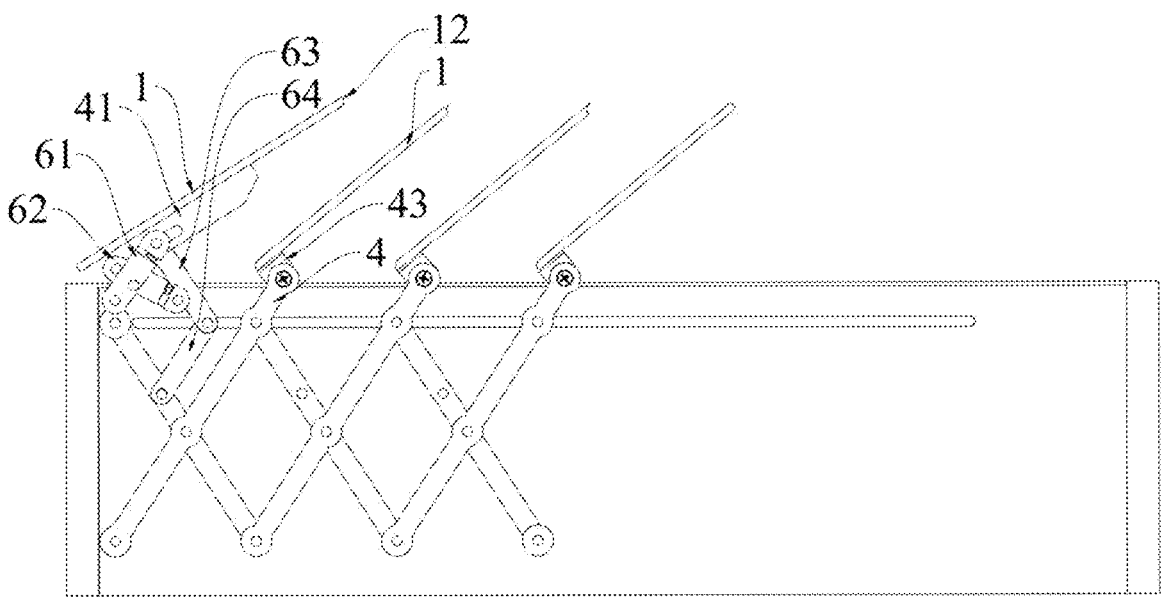
FIG. 19 is a schematic diagram of the scissor mechanism of the pickup truck tonneau cover in a folded state according to an embodiment of the present application.

As shown in FIG. 18 and FIG. 19, this embodiment is a rearward-tilting structure of the cover plate 1, and the lifting and rotating bracket 6 is installed at the front of the truck bed adjacent to the cab 100. The structure of the scissor mechanism is similar to that of the above embodiment. The first support rod 2101 in the intersecting rod assembly 210 is connected to the mounting arm 4, which can also be an extension rod of the first support rod 2101. The cover plate 1 is provided with an ear plate 43, which is fixedly connected to the end of the mounting arm 4 and rotates with the mounting arm 4. Of the two hinge shafts of the adjacent intersecting rod assembly 210, the upper hinge shaft 22 is slidably connected to the slideway 5. The structure of the lifting and rotating bracket 6 is the same as that of the above embodiment, except that a linkage connecting rod 64 is added. The second end of the drive connecting rod 63 is hinged to the upper end of the linkage connecting rod 64 through a hinge shaft. The hinge shaft is slidably provided on the slideway 5, and the lower end of the linkage connecting rod 64 is hinged to the second support rod 2102 of the first intersecting rod assembly 211.

As shown in FIG. 20 to FIG. 23, the scissor mechanism of this embodiment is the same as that of the above embodiment, except that the lifting and rotating bracket 6 is eliminated. The difference is that a waterproof plate 8 is provided on the top surface of the front wall 32 of the truck bed to prevent interference between the mounting arm 4 and the front wall 32 of the truck bed. The first intersecting rod assembly 211 is connected to the corresponding first mounting arm 41 of the plurality of mounting arms 4 through the drive bracket 9. The first cover plate 11 connected to the first mounting arm 41 forms a second lapping part 14 with the waterproof plate 8, and the ends of the second lapping part 14 form matching inclined surfaces, stepped surfaces, or curved surfaces. The drive bracket 9 includes a first driving rod 91 and a second driving rod 92, which are hinged to each other via a sixth pivot 606, which is slidably disposed on the slideway 5. The second end of the first driving rod 91 is hinged to the first mounting arm 41, and the second end of the second driving rod 92 is hinged to the second support rod 2102 of the first intersecting rod assembly 211. The waterproof plate 8 defines an avoidance groove 81. When the scissor mechanism is folded, the first mounting arm 41 is positioned within the avoidance groove 81. A waterproof cover 82 is hinged to the waterproof plate 8. When the scissor mechanism is unfolded, the waterproof cover 82 covers the avoidance groove 81, preventing rainwater and dust from entering the truck bed through the avoidance groove 81. When the scissor mechanism begins to fold from the unfolded state, the waterproof cover 82 is opened by the force of the first cover plate 11 and rotates open with the first cover plate 11.

As shown in FIG. 1 to FIG. 23, a first lapping part 12 is formed between the cover plates 1 and the cover plates 1, and two adjacent cover plates 1 form mutually matching inclined surfaces, stepped surfaces or curved surface structures at the ends of the first lapping part 12. Moreover, the end structures of the first lapping part 12 between different cover plates 1 or the second lapping part 14 between the cover plate 1 and the waterproof plate 8 in the same embodiment can be different, which solves the problem that the cover plates 1 cannot be opened due to interference with each other due to being too tightly fitted. Furthermore, a seal 13 is provided at the lapping part to seal the gap between adjacent cover plates 1, prevent rainwater from seeping into the interior of the truck bed from the lapping part, and improve the waterproof effect.

Figure 28:
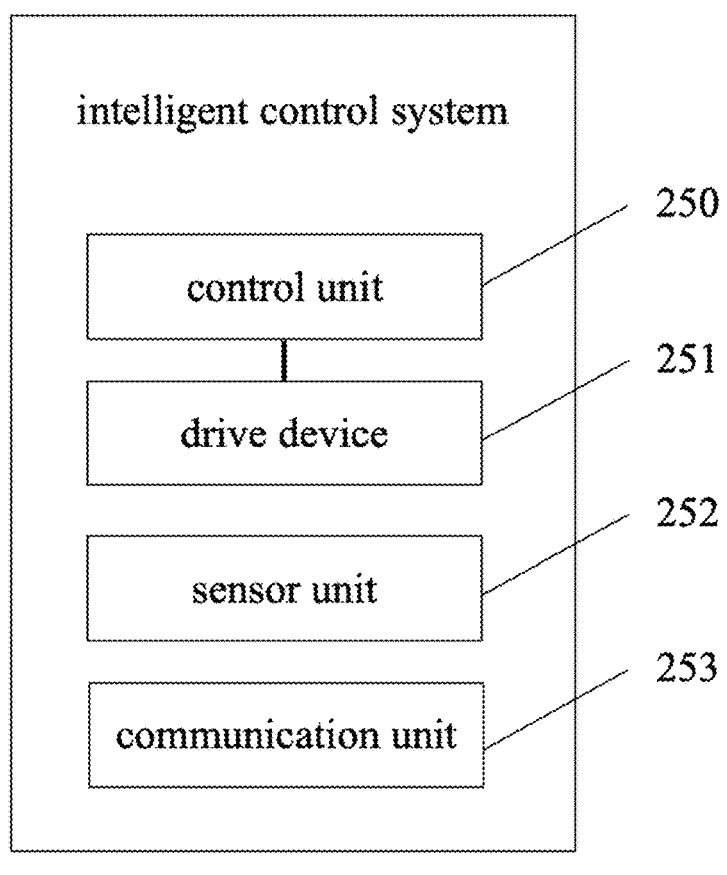
FIG. 28 is a schematic diagram of an intelligent control system of the pickup truck tonneau cover.

As shown in FIG. 28, based on the above embodiments, the pickup truck tonneau cover of the present application further includes an intelligent control system. The intelligent control system may include a control unit 250, a sensor unit 252 and a communication unit 253. The control unit 250 is electrically connected to the drive device 251, and is used to automatically control the folding or unfolding of the scissor mechanism according to the status signal collected by the sensor unit 252, thereby realizing the one-touch opening and closing, automatic reset or timed opening and closing functions of the cover plate. The sensor unit 252 may include a position sensor, a pressure sensor or an infrared detection device, which is used to detect the opening and closing position of the cover and its surrounding obstacles in real time. When an abnormal obstruction is detected, the control unit 250 immediately sends a stop or reverse drive signal to control the drive device 251 to prevent the user from being pinched. The communication unit 253 can be connected to the user terminal or the vehicle-mounted system through wireless communication. When it is detected that the tonneau cover is abnormally opened or pried, it can send an anti-theft warning signal to the user, and can record the number of opening and closing times and the operating status, thereby improving the safety and intelligent experience of use.

In the description of this application, it should be understood that the terms "first" and "second" are used for descriptive purposes only and should not be understood to indicate or imply relative importance or implicitly specify the number of the technical features indicated. Therefore, a feature defined as "first" or "second" may explicitly or implicitly include one or more of the features. In the description of this application, "plurality" means two or more, unless otherwise specifically defined.

In this application, unless otherwise specified or limited, the terms "mounted", "connected", "connect", "fixed", etc. should be understood broadly. For example, they can refer to fixed connection, detachable connection, or integral formation; mechanical connection or electrical connection; direct connection or indirect connection through an intermediate medium; internal communication between two components or interaction between two components. Those skilled in the art will understand the specific meanings of the above terms in the present application based on the specific circumstances.

In the present application, unless otherwise expressly specified and defined, when a first feature is "on" or "under" a second feature, the first and second features may be in direct contact, or may be in indirect contact through an intermediate medium. Furthermore, when the first feature is "above," "over," or "on top of" the second feature, the first feature may be directly above or obliquely above the second feature, or may merely indicate that the first feature is at a height higher than that of the second feature. When the first feature is "below," "under," or "beneath" the second feature, the first feature may be directly below or obliquely below the second feature, or may merely indicate that the first feature is at a height lower than that of the second feature.

In the description of the present specification, the expressions "one embodiment," "some embodiments," "an embodiment," "example," "specific example," or "some examples" mean that the specific features, structures, materials, or characteristics described in connection with the embodiment or example are included in at least one embodiment or example of the present application. In the present specification, the schematic representations of the above terms do not necessarily refer to the same embodiment or example. Furthermore, the specific features, structures, materials, or characteristics described may be combined in any suitable manner in one or more embodiments or examples. In addition, without conflict, those skilled in the art can combine and integrate different embodiments or examples described in the present specification and the features of different embodiments or examples.

Although the embodiments of the present application have been illustrated and described above, it should be understood that the above embodiments are exemplary and should not be construed as limiting the present application. Those of ordinary skill in the art can make changes, modifications, substitutions, and variations to the above embodiments within the scope of the present application.

What is claimed is:

1. A pickup truck tonneau cover, comprising:
   one or a plurality of cover plates; and
   a pair of folding apparatuses respectively mounted at two side walls of a pickup truck bed, wherein,
   each folding apparatus comprises a mounting frame and a folding mechanism;
   the mounting frame is mounted at an inner side of the truck bed;
   the folding mechanism is provided within the mounting frame;
   a plurality of mounting arms are provided at the folding mechanism;
   one end of the cover plate is mounted at a corresponding mounting arm of one folding mechanism, and another end of the same cover plate is mounted at a corresponding mounting arm of another folding mechanism; and the folding mechanism is configured to telescopically move in a length direction of the truck bed, such that the folding mechanism is switchable between an unfolded state and a folded state, and the mounting arms move along with the folding mechanism, such that the cover plate is switchable between a horizontal state and a non-horizontal state.

2. The pickup truck tonneau cover according to claim 1, wherein:

when the folding mechanism is in the unfolded state, the plurality of cover plates are all in the horizontal state and overlapped in sequence, and a top surface of the side wall of the truck bed abuts against bottom surfaces of the plurality of cover plates, placing the truck bed in an enclosed state.

3. The pickup truck tonneau cover according to claim 1, wherein:

when the folding mechanism is in the folded state, the plurality of cover plates are all in a non-horizontal state and retracted to a front of the truck bed adjacent to a cab, placing the truck bed in an open state.

4. The pickup truck tonneau cover according to claim 1, wherein:

the folding mechanism comprises a scissor mechanism;

the scissor mechanism comprises a plurality of intersecting rod assemblies sequentially connected along the length direction of the truck bed; and each of the intersecting rod assemblies comprises one or more pairs of support rods that are hinged to each other.

5. The pickup truck tonneau cover according to claim 4, wherein:

adjacent intersecting rod assemblies are connected with each other via an upper hinge shaft and a lower hinge shaft;

the mounting frame is provided with a slideway arranged along the length direction of the truck bed; and the upper hinge shaft is configured to move along the slideway.

6. The pickup truck tonneau cover according to claim 4, wherein:

ends of adjacent intersecting rod assemblies are meshed with each other via a gear, and rotating shafts of a pair of meshing gears are connected with each other via a connecting member;

the mounting frame is provided with a slideway arranged along the length direction of the truck bed, and the rotating shafts of an upper pair of gears or the connecting member are each configured to move along the slideway.

7. The pickup truck tonneau cover according to claim 4, wherein:

a first intersecting rod assembly among the plurality of intersecting rod assemblies, located at a front end of the scissor mechanism adjacent to the cab, is hinged to the mounting frame.

8. The pickup truck tonneau cover according to claim 7, wherein:

the first intersecting rod assembly is connected to a corresponding first mounting arm among the plurality of mounting arms via a lifting and rotating bracket; and the lifting and rotating bracket is configured to drive the first mounting arm to rotate and lift or lower the first mounting arm, while a pair of support rods of the first intersecting rod assembly pivot relative to each other.

9. The pickup truck tonneau cover according to claim 8, wherein:

all other mounting arms except for the first mounting arm, are respectively connected to one of a pair of support rods of a corresponding intersecting rod assembly.

10. The pickup truck tonneau cover according to claim 8, wherein:

the lifting and rotating bracket comprises a first connecting rod, a second connecting rod and a drive connecting rod;

the first connecting rod and the second connecting rod are hinged via a first pivot;

the first pivot is offset from a center point of the first connecting rod and adjacent to a first end of the first connecting rod; the first pivot is offset from a center point of the second connecting rod and adjacent to a first end of the second connecting rod; and the first end of the second connecting rod is hinged to the first mounting arm;

a first end of the drive connecting rod is hinged to a second end of the first connecting rod via a second pivot; the second pivot is configured to be slidable relative to the first mounting arm; a second end of the drive connecting rod is slidably connected to the slideway via a hinged third pivot, and the scissor mechanism in motion is capable of driving the second end of the drive connecting rod to move along the slideway;

a first end of the first connecting rod is hinged to the mounting frame; a second end of the second connecting rod is slidably connected to the mounting frame via a hinged fourth pivot; and a connection position of the first connecting rod and the second connecting rod on the mounting frame is located above the slideway.

11. The pickup truck tonneau cover according to claim 8, wherein:

the lifting and rotating bracket comprises a first connecting rod and a second connecting rod;

the first connecting rod and the second connecting rod are hinged via a first pivot;

the first pivot is offset from a center point of the first connecting rod and adjacent to a first end of the first connecting rod; the first pivot is offset from a center point of the second connecting rod and adjacent to a first end of the second connecting rod; a second end of the first connecting rod is slidably connected to the first mounting arm via a hinged second pivot; and a first end of the second connecting rod is hinged to the first mounting arm;

a first end of the first connecting rod is hinged to the mounting frame; a second end of the second connecting rod is slidably connected to the slideway via a hinged fourth pivot; and one of a pair of support rods of the first intersecting rod assembly is meshed with the first end of the first connecting rod via a gear.

12. The pickup truck tonneau cover according to claim 7, wherein:

a second intersecting rod assembly among the plurality of intersecting rod assemblies, located at a rear end of the scissor mechanism adjacent to a tailgate, is slidably connected to the slideway;

the second intersecting rod assembly is connected to a corresponding second mounting arm among the plurality of mounting arms via a lifting and rotating bracket; and the lifting and rotating bracket is configured to drive the second mounting arm to rotate and lift or lower the second mounting arm, while a pair of support rods of the second intersecting rod assembly pivot relative to each other.

13. The pickup truck tonneau cover according to claim 12, wherein:

the lifting and rotating bracket comprises a first connecting rod, a second connecting rod and a drive connecting rod;

the first connecting rod and the second connecting rod are hinged via a first pivot;

the first pivot is offset from a center point of the first connecting rod and adjacent to a first end of the first connecting rod; the first pivot is offset from a center point of the second connecting rod and adjacent to a first end of the second connecting rod; and the first end of the second connecting rod is hinged to the second mounting arm;

a first end of the drive connecting rod is hinged to a second end of the first connecting rod via a second pivot; the second pivot is configured to be slidable relative to the second mounting arm; a second end of the drive connecting rod is slidably connected to the slideway via a hinged third pivot, and the scissor mechanism in motion is capable of driving the second end of the drive connecting rod to move along the slideway;

a sliding slot is provided at the mounting frame; the sliding slot is parallel to the slideway and located above the slideway; a second end of the second connecting rod is slidably connected to the sliding slot via a hinged fourth pivot; a first end of the first connecting rod is slidably connected to the sliding slot via a hinged fifth pivot; and the scissor mechanism in motion is capable of driving the first end of the first connecting rod to move synchronously along the sliding slot.

14. The pickup truck tonneau cover according to claim 12, wherein:

the lifting and rotating bracket comprises a first connecting rod and a second connecting rod;

the first connecting rod and the second connecting rod are hinged via a first pivot;

the first pivot is offset from a center point of the first connecting rod and adjacent to a first end of the first connecting rod; the first pivot is offset from a center point of the second connecting rod and adjacent to a first end of the second connecting rod; a second end of the first connecting rod is slidably connected to the second mounting arm via a hinged second pivot; and a first end of the second connecting rod is hinged to the second mounting arm;

a second end of the second connecting rod is slidably connected to the slideway via a hinged fourth pivot; a first end of the first connecting rod is slidably connected to the slideway via a hinged fifth pivot; one of a pair of support rods of the second intersecting rod assembly is meshed with the first end of the first connecting rod via a gear; and rotating shafts of a pair of meshing gears are connected with each other via a connecting member.

15. The pickup truck tonneau cover according to claim 1, wherein:

two adjacent cover plates among the plurality of cover plates form a first lapping part that overlaps each other.

16. The pickup truck tonneau cover according to claim 15, wherein:

the two adjacent cover plates form mutually matching inclined surfaces, stepped surfaces or curved surfaces at an end of the first lapping part.

17. The pickup truck tonneau cover according to claim 15, wherein:

the first lapping part is provided with a seal for sealing a gap between adjacent cover plates.

18. The pickup truck tonneau cover according to claim 7, wherein:

a waterproof plate is provided at a top surface of a front wall of the truck bed; and the first intersecting rod assembly is connected to a corresponding first mounting arm among the plurality of mounting arms via a drive bracket.

19. The pickup truck tonneau cover according to claim 7, wherein:

the waterproof plate and a first cover plate connected to the first mounting arm form a second lapping part that overlaps each other; and mutually matching inclined surfaces, stepped surfaces or curved surfaces are formed at an end of the second lapping part.

20. The pickup truck tonneau cover according to claim 7, wherein:

the waterproof plate is provided with an avoidance groove;

when the scissor mechanism is in the folded state, the first mounting arm is provided in the avoidance groove;

a waterproof cover is hinged to the waterproof plate; when the scissor mechanism is in the unfolded state, the waterproof cover covers the avoidance groove.

21. The pickup truck tonneau cover according to claim 18, wherein:

the drive bracket comprises a first driving rod and a second driving rod; the first driving rod and the second driving rod are hinged via a sixth pivot; and the sixth pivot is slidably provided at the slideway;

a second end of the first driving rod is hinged to the first mounting arm; and a second end of the second driving rod is hinged to one of a pair of support rods of the first intersecting rod assembly.

*    *    *    *    *